(12) United States Patent
Barth

(10) Patent No.: US 12,088,619 B2
(45) Date of Patent: Sep. 10, 2024

(54) IDENTITY-BASED RISK EVALUATION TECHNIQUES

(71) Applicant: PayPal, Inc., San Jose, CA (US)

(72) Inventor: Jonathan Steele Barth, Payson, AZ (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 18/059,792

(22) Filed: Nov. 29, 2022

(65) Prior Publication Data

US 2023/0164165 A1    May 25, 2023

Related U.S. Application Data

(63) Continuation-in-part of application No. 17/812,841, filed on Jul. 15, 2022.

(60) Provisional application No. 63/264,339, filed on Nov. 19, 2021.

(51) Int. Cl.
   *G06F 21/62*    (2013.01)
   *H04L 9/40*    (2022.01)

(52) U.S. Cl.
   CPC ...... *H04L 63/1433* (2013.01); *G06F 21/6245* (2013.01); *H04L 63/102* (2013.01)

(58) Field of Classification Search
   CPC ............ H04L 63/1433; H04L 63/102; G06F 21/6245
   See application file for complete search history.

(56) References Cited

U.S. PATENT DOCUMENTS

| | | | |
|---|---|---|---|
| 6,665,725 B1 * | 12/2003 | Dietz | H04L 45/745 709/228 |
| 6,915,433 B1 | 7/2005 | Barber | |
| 8,782,435 B1 | 7/2014 | Ghose | |
| 9,027,091 B2 | 5/2015 | Mardikar et al. | |
| 10,097,464 B1 * | 10/2018 | Conlon | H04L 47/125 |
| 10,120,993 B2 | 11/2018 | Taveau et al. | |

(Continued)

OTHER PUBLICATIONS

Intel., "What is an MD5 Checksum Value and What is it used for?," Sep. 11, 2012, 3 pages.

(Continued)

*Primary Examiner* — James E Springer
*Assistant Examiner* — Patrick F Ngankam
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed relating to identity-based risk evaluation using risk scores for different identities. The disclosed techniques include a server system that provides a service usable to perform computing operations for requesting users. The system may receive a request to perform a particular computing operation from a client device. Based on a name of a user associated with the request, the system assigns an first type of identity that is a birthright identity to the user. Based on details of the request, the system assigns additional identities to the user that are different identity types than the first type of identity. The system may score, based on accessing a risk score database storing known risk information associated with different identity types, the first type of identity and the additional identities. The system may generate a response based on the scoring and transmit the response to the client device.

20 Claims, 11 Drawing Sheets

(56) References Cited

U.S. PATENT DOCUMENTS

| | | | |
|---|---|---|---|
| 2005/0071643 A1* | 3/2005 | Moghe | H04L 63/1441 713/182 |
| 2005/0171937 A1 | 8/2005 | Hughes et al. | |
| 2010/0293533 A1 | 11/2010 | Andrade et al. | |
| 2012/0155831 A1 | 6/2012 | Uchida | |
| 2013/0283356 A1* | 10/2013 | Mardikar | H04L 63/08 726/4 |
| 2017/0289134 A1* | 10/2017 | Bradley | H04L 63/105 |
| 2018/0123940 A1 | 5/2018 | Rimar et al. | |
| 2018/0359244 A1* | 12/2018 | Cockerill | H04L 63/12 |
| 2020/0228489 A1* | 7/2020 | Shaikh | H04L 61/5007 |

OTHER PUBLICATIONS

McAvoy P., "Continuous Digital Risk Management (DevRiskOps)," RSA Labs, Retrieved on Jul. 29, 2019, Retrieved from Internet URL: https://community.securid.com/t5/rsa-labs-ideas/continuous-digital-risk-man, 3 pages.

Stojiljkovic M., "The Pandas DataFrame: Make Working With Data Delightful," Real Python, Feb. 14, 2022, 37 pages.

White S.K., "What is a CMDB? A Data Warehouse for Your IT Environment," CIO.Com, Jun. 15, 2021, 7 pages.

Wikipedia., "MD5," Retrieved on Feb. 5, 2022, Retrieved from Internet URL: https://en.wikipedia.org/w/index.php?title=MD5&oldid=1070032706, 13 pages.

International Search Report and Written Opinion for Application No. PCT/US2022/079272 mailed on Feb. 28, 2023, 9 pages.

Sun X., et al., "Detecting Code Reuse in Android Applications Using Component-Based Control Flow Graph," IFIP International Federation for Information Processing, Jun. 4, 2014, Retrieved from Internet URL: https://link.springer.com/chapter/10.1007/978-3-642-55415-5_12, Retrieved on Jan. 3, 2023, 14 pages.

\* cited by examiner

500

```
┌─────────────────────────────────────────────────────────────────────┐
│ Provide a service usable to perform a plurality of computing operations for requesting users, │
│ where the server system includes components with corresponding component identifier values │
│                                    502                              │
└─────────────────────────────────────────────────────────────────────┘
                                    ↓
┌─────────────────────────────────────────────────────────────────────┐
│    Receive, from a client device, a request to perform a particular computing operation │
│                                    504                              │
└─────────────────────────────────────────────────────────────────────┘
                                    ↓
┌─────────────────────────────────────────────────────────────────────┐
│ Perform the particular computing operation via a particular processing flow in which a particular │
│ sequence of the components perform a series of tasks associated with the particular computing │
│                                  operation                          │
│                                    506                              │
└─────────────────────────────────────────────────────────────────────┘
                                    ↓
┌─────────────────────────────────────────────────────────────────────┐
│      Generate a particular flow signature value for the particular processing flow │
│                                    508                              │
└─────────────────────────────────────────────────────────────────────┘
                                    ↓
┌─────────────────────────────────────────────────────────────────────┐
│   Generating a flow identifier value for the particular processing flow │
│      by combining component identifier values for the particular    │
│    sequence of components used to perform the series of tasks       │
│                                    510                              │
└─────────────────────────────────────────────────────────────────────┘
                                    ↓
┌─────────────────────────────────────────────────────────────────────┐
│   Performing a hash operation based on the flow identifier value to │
│          generate the particular flow signature value               │
│                                    512                              │
└─────────────────────────────────────────────────────────────────────┘
```

Example Database 650

| User's Name 664A | Identity Type 674 | Assigned Identity 672 | Enabled? 664B | Risk Score 682 | Attempts 664C |
|---|---|---|---|---|---|
| Anastasia | Birthright (Login) ID | "A" | Yes | 2.1 | 1 |
| Anastasia | Work Personal Computer (PC) | "192.158.1.38" | Yes | 4.5 | 1 |
| Dima | Administrator | "AdminD" | Yes | 16.5 | 3 |
| Katherine | Mobile Device | "MobileK1234" | No | 10.4 | 2 |
| James | Application | "MobileJ55" | Yes | 12.5 | 3 |
| James | Birthright (Login) ID | "J" | Yes | 2.3 | 3 |

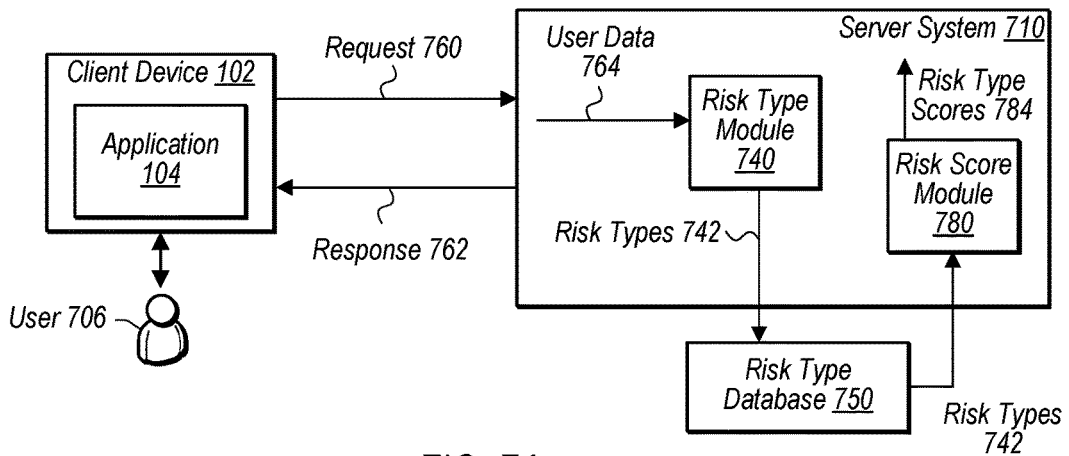

FIG. 7A

Example Risk Type Database 750

*Identity Risk Type Table 720*

| Identity Risk Type 722 | Vendor | Key | Admin | Token | Application | Test | Service |
|---|---|---|---|---|---|---|---|
| Identity Risk Type Score 724 | 2 | 5 | 10 | 7 | 4 | 0 | 3 |

*Asset Risk Type Table 730*

| Asset Risk Type 732 | Physical | Ingress | Admin Application | Control Point | Risk View | Database | Experience |
|---|---|---|---|---|---|---|---|
| Asset Risk Type Score 734 | 4 | 7 | 9 | 6 | 8 | 9 | 3 |

*Employee Risk Type Table 770*

| Employee Risk Type 772 | Customer Service Agent | Full-time Equivalent (FTE) | VIP | Guest |
|---|---|---|---|---|
| Employee Risk Type Score 774 | 3 | 8 | 11 | 1 |

*Identity Role Risk Type Table 790*

| Identity Role Risk Type 792 | Birthright | Personally Identifiable Information (PII) | Admin Application | Finance | Payment Card Industry (PCI) | Data Egress |
|---|---|---|---|---|---|---|
| Identity Role Risk Type Score 794 | 1 | 12 | 10 | 6 | 5 | 11 |

```
┌─────────────────────────────────────────────────────────────────┐
│  Provide a service usable to perform a plurality of computing   │
│                  operations for requesting users.               │
│                              1002                               │
└─────────────────────────────────────────────────────────────────┘
                                 │
                                 ▼
┌─────────────────────────────────────────────────────────────────┐
│ Receive, from a client device, a request to perform a particular│
│                      computing operation.                       │
│                              1004                               │
└─────────────────────────────────────────────────────────────────┘
                                 │
                                 ▼
┌─────────────────────────────────────────────────────────────────┐
│ Assign, based on a name of a user associated with the request,  │
│ an identity of a first type to the user, where the first type   │
│              of identity is a birthright identity.              │
│                              1006                               │
└─────────────────────────────────────────────────────────────────┘
                                 │
                                 ▼
┌─────────────────────────────────────────────────────────────────┐
│ Assign, based on details of the request, one or more additional │
│ identities to the user, where the one or more additional        │
│ identities are different identity types than the first type of  │
│                   identity assigned to the user.                │
│                              1008                               │
└─────────────────────────────────────────────────────────────────┘
                                 │
                                 ▼
┌─────────────────────────────────────────────────────────────────┐
│ Score the first type of identity and the one or more additional │
│ identities, where the scoring is performed based on accessing a │
│ risk score database storing known risk information associated   │
│                   with different identity types.                │
│                              1010                               │
└─────────────────────────────────────────────────────────────────┘
                                 │
                                 ▼
┌─────────────────────────────────────────────────────────────────┐
│ Transmit, to the client device, a response to the request,      │
│         where the response is generated based on the scoring.   │
│                              1012                               │
└─────────────────────────────────────────────────────────────────┘
```

FIG. 10

IDENTITY-BASED RISK EVALUATION TECHNIQUES

RELATED APPLICATIONS

The present application is a continuation-in-part of U.S. application Ser. No. 17/812,841, entitled "COMPONENT-BASED RISK EVALUATION TECHNIQUES USING PROCESSING FLOW SIGNATURES," filed Jul. 15, 2022, which claims priority to U.S. Provisional App. No. 63/264,339, entitled "COMPONENT-BASED RISK EVALUATION TECHNIQUES USING PROCESSING FLOW SIGNATURES," filed Nov. 19, 2021, the disclosures of each of the above-referenced applications are incorporated by reference herein in their entireties.

BACKGROUND

Technical Field

This disclosure relates generally to computer system reliability, and more particularly to identity-based risk evaluation techniques that utilize assigned risk types.

Description of the Related Art

A server system may provide various services (e.g., web services) in which the computing resources of the server system perform computing operations on behalf of a requesting entity, such as an end user. A given service may be made up of many individual computing operations that may be performed for an end user. In performing a given one of these computing operations, the server system may use a processing flow that utilizes a combination of many different components. These components may be shared by multiple different processing flows to support the various computing operations. Accordingly, as the server system services a request, the associated processing flow may utilize a combination of many different components to generate the desired result for the user. In some instances, however, this component-based approach may present various technical challenges, particularly as the number of components utilized by the server system increases.

BRIEF DESCRIPTION OF THE DRAWINGS

FIG. 5 is a flow diagram illustrating an example method for performing component-based risk evaluation using processing flow signatures, according to some embodiments.

FIG. 7A is a block diagram illustrating an example system configured to assign risk types to various elements corresponding to a request and determine risk scores for the request, according to some embodiments.

FIG. 7B is a block diagram illustrating an example database storing assigned risk types, according to some embodiments.

FIG. 10 is a flow diagram illustrating an example method for performing identity-based risk evaluation, according to some embodiments.

DETAILED DESCRIPTION

Figure 1:
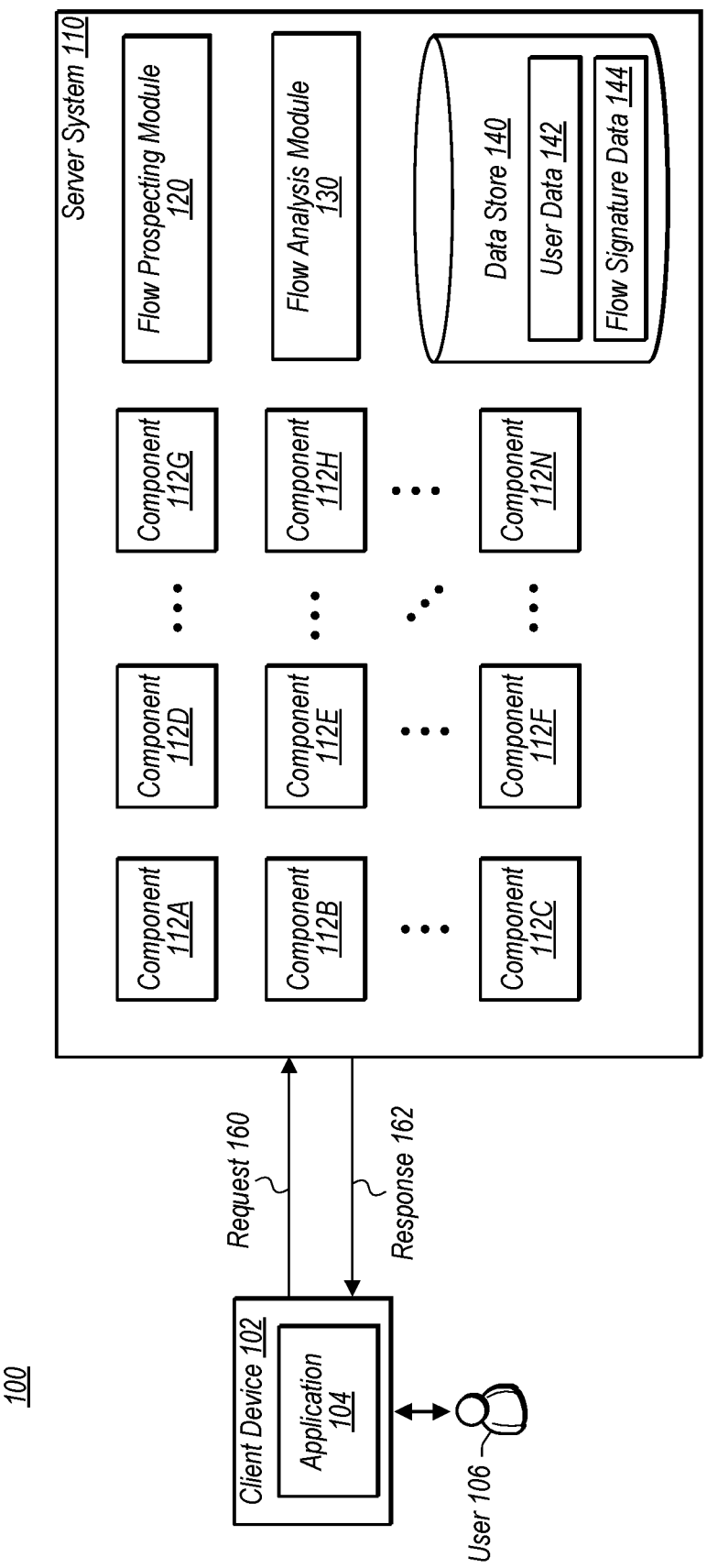
FIG. 1 is a block diagram illustrating an example server system that utilizes a set of components, according to some embodiments.

A server system may provide various services (e.g., web services) in which the computing resources of the server system (including hardware or software elements of the server system) perform computing operations on behalf of a requesting entity, such as an end user. Non-limiting examples of web services a server system may provide include email services, streaming media services, map-based services, online payment services, retail services, etc.

A given service may be made up of many individual computing operations (also referred to herein as "experiences") that may be performed for an end user. Consider, as a non-limiting example, an embodiment in which a server system (e.g., implemented using multiple different, geographically diverse datacenters) provides an online payment service to many users (e.g., millions of users). In this example embodiment, the online payment service may allow end users to perform various computing operations, such as creating a user account, adding funding sources, sending and receiving funds to other user accounts, etc.

In performing a given one of these computing operations, the server system may use a processing flow that utilizes a combination of multiple (and, potentially, many) "components." As used herein, the term "component" refers to a hardware or software element used to perform a portion of the computation used to complete the requested computing operation. Various non-limiting examples of components are described in detail below. In the context of a configuration management system utilized by the server system, a "component," as used herein, may also be referred to as a "configuration item" (or "CI"), where the configuration management system may use various processes to monitor the status of the individual CIs in use in the system. In this disclosure, the term "processing flow" refers to a sequence of components used by the server system to perform a requested computing operation (e.g., transferring funds between user accounts, as one non-limiting example).

A server system may include a large number (e.g., thousands, tens of thousands, etc.) of distinct components. These components may be created by, and shared between, different teams or divisions within the entity operating the server system such that different components are "owned" or managed by different internal entities. In such an embodiment, when designing the processing flows that will be used to perform the computing operations offered, different combinations of components may be selected, used, and shared to support the various computing operations. Accordingly, as the server system services a request, the associated processing flow may utilize a combination of many different components to generate the desired result for the user. Note, however, that there may be changes to any number (e.g., thousands) of these components on a daily basis, for example, as part of ongoing software development efforts. Further, in some instances, the number of components used in a given processing flow can be large (e.g., 100, components, 1,000 components, 10,000 components, etc.).

While this component-based approach does facilitate scalability by allowing components to be created, managed, and shared between internal entities and experiences, it also presents various technical problems. For example, the processing flow for a given computing operation may change over time. Consider, as a non-limiting example, a particular component that is used in the processing flow associated with ten different computing operations included in the service provided by the server system. In this example, if there is a change to this particular component, it will affect the ten different processing flows associated with these ten different computing operations. Accordingly, if this change to the particular component negatively impacts the performance of this particular component, the performance of each of these ten different processing flows may also be negatively impacted (or prevented altogether).

Using prior techniques, there is little to no visibility about the underlying components included in a given processing flow, the changes made to those components, the performance of those components, the decommissioning of components, etc. Further, using prior techniques, these components may be treated as a group or "batch" (e.g., tier-1 databases) rather than as individual components. Accordingly, it may be difficult or impossible to determine, for a given computing operation, the identity and status of the underlying components included in the processing flow used to perform that given computing operation. Further, using prior approaches, there is no suitable technique that may be used to quantify the risk (e.g., to the server system, the service(s) it provides, the business it supports, etc.) associated with the constant changes to the components in the system.

In various embodiments, the disclosed techniques address these technical problems by using component-based risk evaluation techniques that use processing flow signature values to monitor and analyze the processing flows—and therefore the components—utilized by the server system. For example, in various embodiments, the disclosed techniques include assigning some or all of the components within a server system with a corresponding component identifier value. In some embodiments, for example, a component identifier value is an immutable name that uniquely identifies a particular component. As a requested computing operation is performed by the server system, these component identifier values may be used to create a flow identifier value indicative of the sequence (that is, the identity and order) of components included in the particular processing flow used, by the server system, to perform the requested computing operation. Stated differently, as different components in the processing flow are used, the identifier values for these different components are logged and combined (e.g., concatenated) to form a flow identifier value that indicates the sequence of components used by the server system to perform a given processing flow. Various embodiments further include creating a processing flow signature value by performing a hash operation on (that is, computing a hash value from) this flow identifier value. In one non-limiting embodiment, the disclosed techniques store a processing flow signature value, optionally along with one or more other items of information, associated with some or all of the processing flows performed by the server system. Non-limiting examples of additional information that may be logged includes: a flow identifier value corresponding to the flow signature value, a timestamp indicating a time at which the processing flow was performed, a counter indicating the number of times that the processing flow with a particular flow signature value was performed within a given time period, etc.

Maintaining these items of information may provide various technical benefits. For example, when a processing flow is completed and a new processing flow signature value is generated, that processing flow signature value may be compared to processing flow signature values generated for previous instances of that processing flow. In the event that the new signature value fails to match the previous signature values, the disclosed techniques may determine that there has been a change to one or more of the components included in that processing flow. Once this change has been detected, various embodiments include using the flow identifier values for this processing flow to identify which of the underlying component(s) has changed. Non-limiting examples of changes to the components may include: additions of new components to the processing flow, modification of existing components in the processing flow, and removal or decommissioning of components included in the processing flow. Once the relevant components have been identified (e.g., in a real-time or near real-time manner), further investigation into the nature and extent of the changes to these components can be performed. Accordingly, various disclosed embodiments provide improved visibility into the identity and status of the combination of components included in the various (and, potentially, numerous) processing flows used by the server system. Additional technical benefits provided by various disclosed embodiments are described in more detail below.

Referring now to FIG. 1, block diagram 100 depicts a server system 110 that includes a set of components 112A-112N (or, collectively, components 112), a flow prospecting module 120, a flow analysis module 130, and a data store 140. In various embodiments, server system 110 provides one or more computing resources as part of a service (e.g., a web service) that may be used directly by end users or that may be integrated with (or otherwise used by) services provided by third-parties. As one non-limiting example, server system 110, in some embodiments, provides an online payment service that may be used by end users to perform online financial transactions (e.g., sending or receiving funds) or utilized by merchants to receive funds from users during financial transactions. Note, however, that this embodiment is described merely as one non-limiting example. In other embodiments, server system 110 may provide any of various suitable services, such as an email service, a streaming media service, etc. Additionally note that, in some embodiments, a "server system" (such as server system 110) may be implemented using a single machine. In other embodiments, however, a "server system" may be implemented using multiple machines executing (e.g., at one or more datacenters) for the benefit of a single entity. For example, in some embodiments, server system 110 may be implemented using multiple machines located at one or more geographically remote datacenters.

FIG. 1 further includes client device 102 operated by user 106. Client device 102 may be any of various suitable computing devices, such as a smartphone, laptop computer, desktop computer, tablet computer, etc. that user 106 may use to access the service(s) provided via server system 110. For example, in various embodiments, client device 102 executes a software application 104, such as a web browser or a service-specific software application, usable to access one or more computing resources provided by the server system 110. In the depicted embodiment, user 106 uses client device 102 to send a request 160 to perform a computing operation via a service provided by server system 110. As a non-limiting example, consider an embodiment in which the requested computing operation specified by request 160 is to check an account balance of a user account of the user 106.

In various embodiments, the server system 110 utilizes different combinations of components 112 to perform the various computing operations available via the service the server system 110 provides. For example, to service request 160, the server system 110 implements a processing flow that utilizes a sequence of components 112 to perform a series of tasks (or "sub-operations") necessary to complete the requested computing operation. Non-limiting examples of these tasks could include any of various different computational sub-operations, such as user-verification, risk evaluation, data retrieval, routing, load balancing, etc., that need to be completed in order to accomplish the broader computing operation requested by the user. As a simplified example for the purposes of illustration, assume that the processing flow utilized by the server system 110 uses the following sequence of components 112 to perform the requested computing operation for request 160: component 112A, 112B, 112D, 112E, and 112N. (Note that, in many embodiments, a processing flow may include a sequence of any number (e.g., hundreds, thousands, etc.) of components 112.) Once the processing flow has completed execution (e.g., by successfully performing the requested operation, through an unexpected termination of the processing flow, etc.), the server system 110 may provide a response 162 to the client device 102.

Non-limiting examples of "components" that may be included in a processing flow include an asset, a container that is running a service, a virtual machine, a third-party library, a physical asset, business logic that is embedded into an application, a Kubernetes cluster, etc. Consider, as a non-limiting example, an instance in which a service (provided by the server system 110) runs an API that may be used by requesting entities (e.g., end users, third-party systems, etc.) to send a request to that service. In this example, the service running the API would be considered a "component." Further, assume that this API has a particular configuration such that it accepts, in a properly formatted API request, a particular set of parameters. This configuration for the API, in various embodiments, will have an associated component identifier value. If that configuration is later changed (e.g., to modify the particular set of attributes included in an API request), that change would result in the assignment of a new identifier value for that component. When the flow signature value (e.g., hash value) for a processing flow that includes this service is later computed, this change to the configuration will result in a change to the signature value. As described herein, that change in signature value may be investigated further to identify the source of this change (the update to the API specification, in the current example).

Various embodiments include utilizing identifier values associated with components in the server system to track which components within the infrastructure of the server system 110 are in use for the various processing flows. As one non-limiting example, a processing flow may include the sequence of components 112 (or simply the set of components 112 that have been assigned a component identifier value) used by the server system 110 from the ingress point of a request (e.g., a request 160 from a user 106), to a database, through one or more software applications or microservices, to a point of egress at which a response is provided to the user. In various embodiments, the disclosed techniques include generating flow signature values for the processing flows utilized by the server system 110 to service client requests. In some embodiments, for example, the server system 110 generates a flow signature value as a hash value based on a concatenation (or other combination) of the identifier values for the sequence of components in the utilized processing flow. By using the component identifier values for each of the components in a processing flow and using these component identifier values to create the flow signature value, the disclosed techniques are capable of modeling the processing flow for a given computing operation. These flow identifier values and flow signature values may be generated and stored over time for many (or all) of the different processing flows used by the server system 110, which, in various embodiments, helps to identify any changes in the components 112 included in a processing flow.

In various embodiments, the disclosed techniques may be said to operate in two complementary (and, optionally, simultaneous) phases: a prospecting phase, and a reconciliation phase. In various embodiments, the reconciliation phase and prospecting phase may be said to operate as state machines within an overall autonomous system. During the prospecting phase, the flow prospecting module 120 generates flow signature values for the permissible processing flows that are permitted via the server system 110. That is, flow prospecting module 120 generates flow signature values for the sequences of components 112 that are permitted based on the logic and constraints of the individual components 112. In various embodiments, the prospecting operations may be repeated (e.g., on a periodic basis) to generate new and updated flow signature values as components are added to or removed from the server system 110. Flow prospecting module 120 and various embodiments of the prospecting phase are described in detail below with reference to FIG. 4.

The prospecting phase may be thought of as a "non-production" phase because, in various embodiments, the prospecting operations are performed independent of the requests being received and serviced by the server system 110. The reconciliation phase, by contrast, may be thought of as a "production phase" because, in various embodiments, the reconciliation operations discussed herein are performed based on the instantiated production environment used by server system 110 to service requests from clients. For example, as a request is serviced, a flow signature value may be created based on the component identifiers for the sequence of components used to service that request. This process of generating flow signature values for the processing flows used by the server system 110 may be performed for all (or any desired subset) of the requests received by the server system 110. Note that, in embodiments in which server system 110 hosts a large-scale service, server system 110 may receive many (e.g., millions) requests each day. In various embodiments, flow signature values generated either by the flow prospecting module 120 during a prospecting operation, or by the server system 110 while performing computing operations to service requests from requesting users, may be stored as part of flow signature data 144 in data store 140 included in (or accessible to) server system 110.

In various embodiments, the disclosed techniques include analyzing these flow signature values generated during the reconciliation phase, which may provide various technical benefits—particularly in the context of server systems providing large-scale services used by many users. For example, in various embodiments the disclosed techniques improve the ability to monitor the use of, and detect risks associated with, the various (and often numerous) processing flows and components 112 utilized by the server system 110.

Various embodiments of flow analysis module 130 and the disclosed flow analysis techniques are described in detail below with reference to FIG. 3. In various embodiments, these flow analysis techniques may provide various technical benefits to the server system 110. For example, in various embodiments the flow analysis techniques include using the flow signature values to detect changes to the components 112 included in the processing flows used by server system 110. As described below, this may enable the efficient tracking and monitoring of components 112 utilized in business-critical processing flows such that, when a change is made to one or more components 112, this change may be detected in a fast and efficient manner. Further, in various embodiments, the flow analysis operations include tracking the number of times that different processing flows are used during a given time interval, which may be particularly useful for tracking changes in "velocity" with respect to the server system 110 as a whole and with respect to specific processing flows.

Additionally, in some embodiments, the flow analysis techniques include detecting "unexpected" processing flows performed by the server system 110. For example, as explained below, the flow analysis module 130 may compare the flow signature values generated during the reconciliation phase to the flow signature values generated during the prospecting phase and, if there is not a match, the processing flow associated with that flow signature value may be deemed "unexpected" and flagged for further investigation. By contrast, using prior techniques it may be difficult or impossible to detect when an "unexpected" processing flow has been used by the system. Further, in various embodiments, the flow analysis techniques include identifying a particular component (or components) as a point-of-failure in a processing flow. For example, as described below, in addition to a flow signature value, in various embodiments each processing flow will also have an associated "return code" (e.g., an HTTP status code) indicative of the outcome of the processing flow that may be used to determine whether a requested operation was successfully performed. If not, various embodiments include using the flow signature value (or the underlying flow identifier value) to identify a component that acted as a point-of-failure for the processing flow. This approach to identifying a point-of-failure component may provide significant technical benefits, for example by allowing a malfunctioning component in a processing flow—out of, for example, thousands of possible components—to be identified in a fast and computationally efficient manner.

Figure 2:
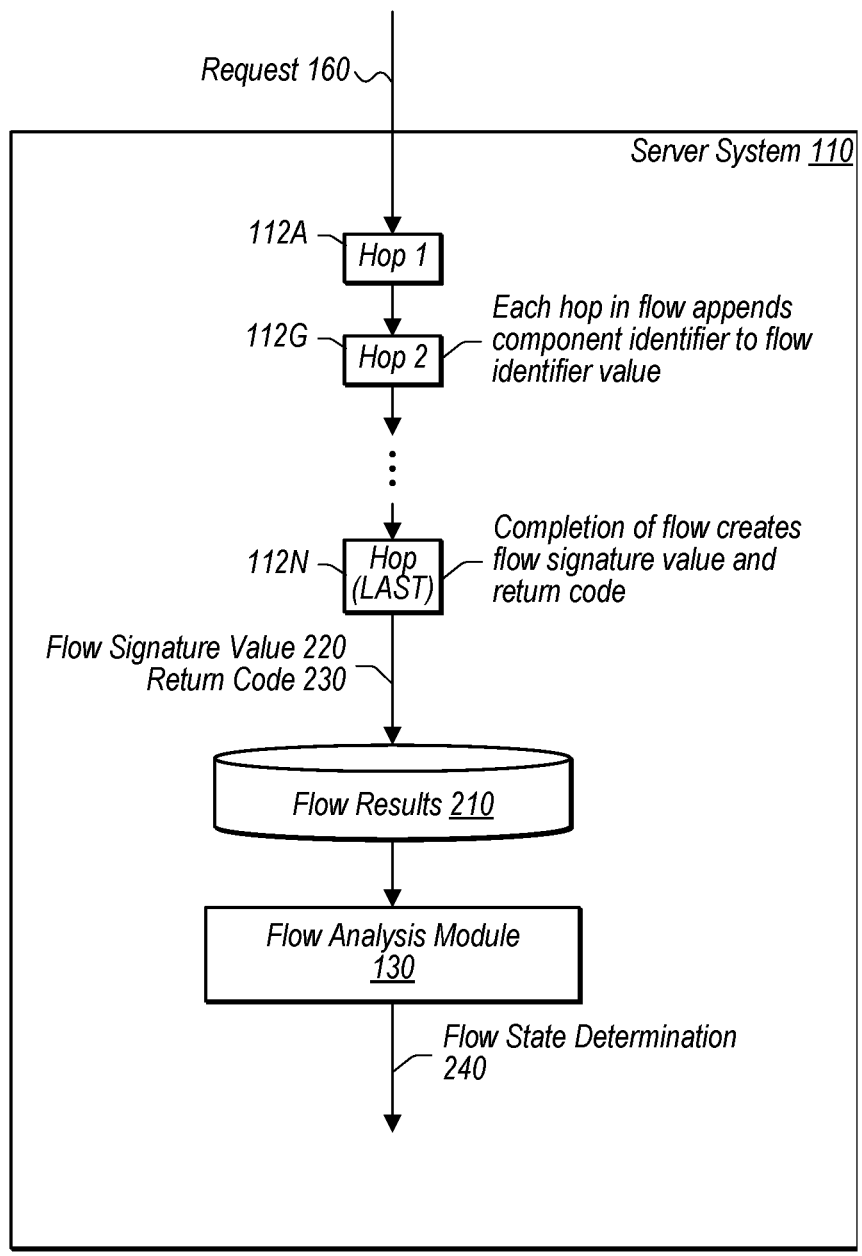
FIG. 2 is a block diagram illustrating an example server system generating a flow signature value while implementing a processing flow, according to some embodiments.

Referring now to FIG. 2, block diagram 200 depicts an embodiment in which server system 110 generates a flow signature value 220 while implementing a processing flow to service a request 160 for a user 106.

As noted above, in various embodiments the server system 110 utilizes different combinations of components 112 to perform computing operations provided via the service that it hosts. The various components 112 used by a particular processing flow may be utilized in a particular sequence so as to perform a series of tasks needed to complete the requested computing operation. As shown in FIG. 2, in some embodiments these components 112 may be referred to as "hops" to signify that a component 112 in a processing flow is one step of many taken to complete a requested operation.

In various embodiments, each component 112 in the processing flow assists in creating a flow identifier value for that processing flow. For example, in some embodiments the flow identifier value for a particular processing flow is a combination (e.g., a concatenation) of the components 112 used in that processing flow in the order in which the respective components 112 were utilized. For example, in various embodiments, a flow identifier value (e.g., an alphanumeric value) is created by appending the component identifier value (e.g., a unique, immutable name) of each successive component 112 in the processing flow, and a flow signature value 220 is created by taking a hash of the flow identifier value. Accordingly, in various embodiments this flow signature value 220 is specific to the sequence of components 112 used in the corresponding processing flow, and the same flow signature value 220 will be generated each time that same processing flow (that is, the exact same sequence of components 112) is used by the server system 110 to service a request.

With reference to the non-limiting example shown in FIG. 2, for instance, the depicted processing flow first utilizes component 112A. In some embodiments, once component 112A completes its task, it may add its unique component identifier value to a flow identifier value for the particular processing flow. In this non-limiting example, the component identifier value for component 112A would be the first and only identifier value included in the flow identifier value at this point. In various embodiments, the flow identifier value may be passed (e.g., in an HTTP header field, such as a cookie) from component 112 to component 112 in the flow such that each subsequent component 112 can append their respective identifier value to the end (or beginning, in some implementations) of the running flow identifier value.

In the depicted embodiment, the last hop in the processing flow is component 112N. In various embodiments, the final component 112 in a processing flow may both add its identifier value to the flow identifier value and, once completed, generate a flow signature value 220 based on the flow identifier value. In various embodiments, the flow signature value 220 may be a hash value generated by taking a hash of the flow identifier value. As one non-limiting example, in some embodiment the md5 message-digest algorithm may be used to generate a flow signature value 220 based on the flow identifier value. Note, however, this is merely one non-limiting example and, in other embodiments, any suitable hashing algorithm may be used. Further, in other embodiments, the flow signature value 220 may be generated using other suitable encoding techniques (e.g., encoding techniques that do not utilize a hash function).

In the depicted embodiment, the flow signature value 220 is stored, along with a return code 230 (e.g., an HTTP status code), in flow results 210. As an example, for a particular utilization of a processing flow, the flow results 210 may include a corresponding data record that specifies the flow signature value 220 and the associated return code 230 (optionally along with one or more other items of information, e.g., a timestamp, as desired). For example, various embodiments include storing, in flow results 210, one or more of the flow identifier value, the processing flow signature value 220, the return code 230, and a timestamp associated with some or all of the processing flows performed by the server system 110 for a given period of time (e.g., week, month, year, etc., or indefinitely).

In various embodiments, a flow signature value 220 and return code 230 may be stored in flow results 210 for each (or any desired subset) of the processing flows utilized by the server system 110 for subsequent analysis. For example, as shown in FIG. 2, in various embodiments the flow results 210 may be accessed and analyzed by the flow analysis module 130. Various non-limiting embodiments of flow analysis module 130 are described in detail below with reference to FIG. 3. For the purposes of the present discussion, however, note that flow analysis module 130, in various embodiments, is operable to analyze the flow signature value 220 and return code 230 and, based on that analysis, generate a flow state determination 240. In various embodiments, this flow state determination 240 may include one or more items of information corresponding to the processing flow, which may be used for various flow analysis techniques described herein, for example to monitor and detect changes in flow velocity, detect unexpected processing flows, and identify point-of-failure components.

Figure 3:
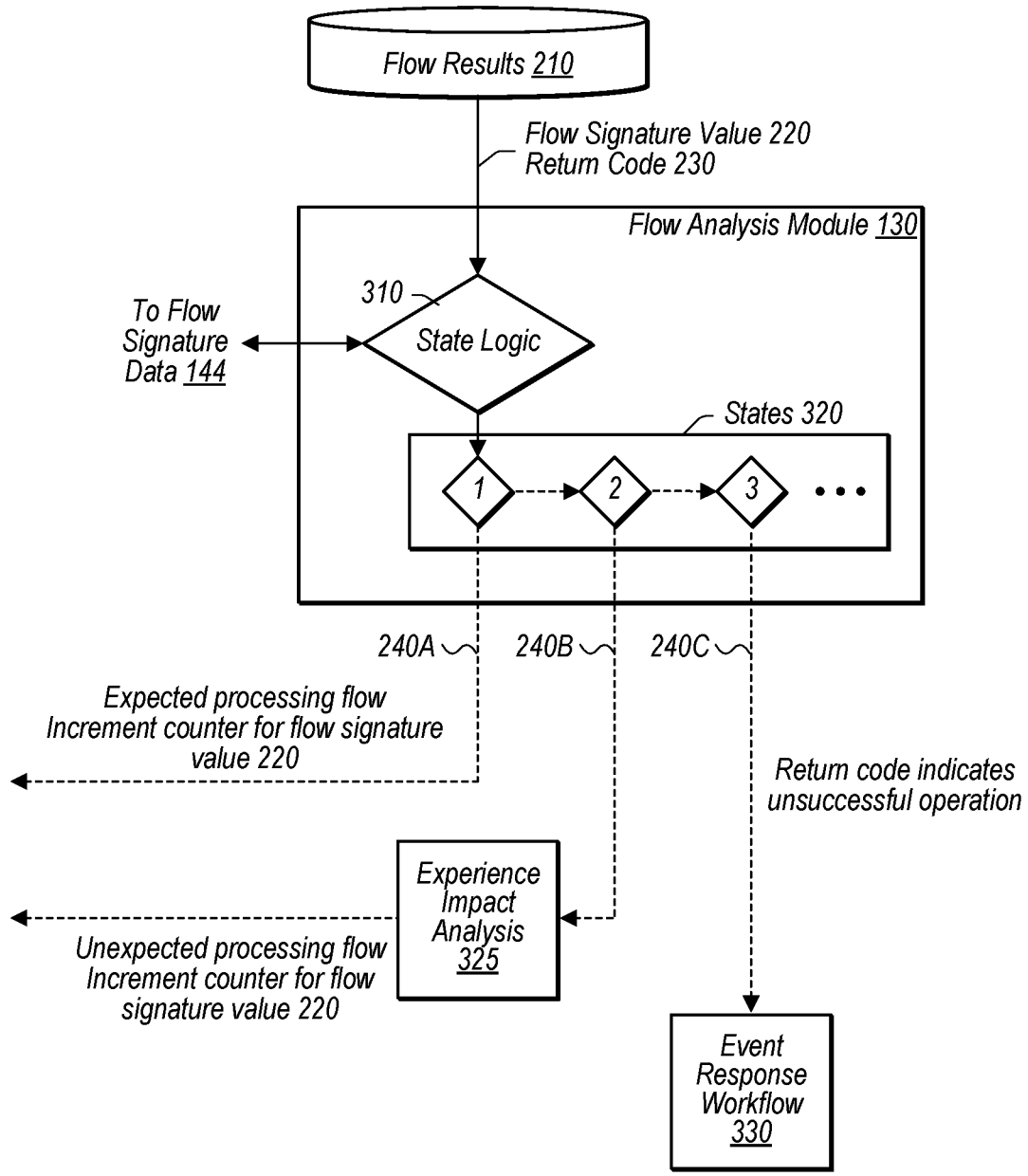
FIG. 3 is a block diagram illustrating an example flow analysis module, according to some embodiments.

Referring now to FIG. 3, block diagram 300 depicts an embodiment of flow analysis module 130 evaluating flow results 210 associated with the processing flows used by the server system 110 to perform requested computing operations. In the depicted embodiment, flow analysis module 130 is depicted as a state machine that includes state logic 310 and a set of states 320. (Note that, although only 3 states are explicitly depicted in FIG. 3 for clarity, this is simply one non-limiting embodiment. In other embodiments, flow analysis module 130 may reach any suitable number of states based on the state logic 310.)

In various embodiments, state logic 310 utilizes flow signature data 144 (e.g., including the flow signature values generated during the prospecting phase) to analyze the flow signature value 220 and return code 230 and generate an appropriate flow state determination 240. As a non-limiting example, for each result (e.g., stored as a character string formatted as a "flow signature value 220: return code 230" value) in flow results 210, the state logic 310 may split the result such that flow signature value 220 is added to a set "E" (corresponding to "experiences"), the return code 230 is added to a set "RC," and a counter associated with that particular flow signature value 220 and return code 230 combination is incremented. Further, in some such embodiments the state logic 310 may then evaluate each of the "experiences" in the set E. For example, as described in more detail below, if the return code 230 indicates that a requested operation was not successfully completed, the flow analysis module 130 module may increment a counter associated with that return code 230 and trigger an event-response workflow. If, however, the return code 230 indicates that the requested operation was successful, the flow analysis module 130 may determine whether the flow signature value 220 matches a flow signature value 220 generated during prospecting. If so, an appropriate counter may be incremented to track that occurrence. If not, the flow analysis module 130 may initiate an impact analysis workflow for further investigation. Various non-limiting embodiments of these flow analysis operations are now described in more detail below.

For example, as shown in FIG. 3, in various embodiments the flow analysis module 130 determine an appropriate flow state determination 240 by determining whether the return code 230 for the processing flow indicates whether the request was successful or not. In some embodiments, for example, the return codes may be HTTP status codes that indicate whether a requested operation specified by a request (e.g., request 160) has been successfully completed. In such embodiments, for example, the 2xx class of status codes (e.g., the 200 OK status code) indicates that the request was successful, while the 5xx class of status codes (e.g., the 500 Internal Server Error status code) indicates that the server was unsuccessful in complete the requested operation.

If the return code 230 indicates that a processing flow was unsuccessful (indicated by State 3 in FIG. 3), the flow analysis module 130 may generate a flow state determination 240C indicating that the requested operation was unsuccessful. In the depicted embodiment, for example, this flow state determination 240 may be provided to an event response workflow 330 for further investigation. In various embodiments the flow analysis techniques include identifying a particular component 112 (or components 112) as a point-of-failure in a processing flow. For example, if the return code 230 indicates that a requested operation was not successful, the flow analysis module 130 (or another module in server system 110) may use the flow signature value 220 to identify a component 112 that caused the processing failure. As a non-limiting example, while servicing a request, one of the components 112 in the processing flow may be malfunctioning, causing the processing flow to fail to complete the requested computing operation. In some such embodiments, the disclosed techniques may stop appending component identifier values to the flow identifier value at a point of failure such that, when a processing flow fails, the disclosed techniques may identify the final component 112 specified in the flow identifier value as a point of failure for the processing flow. As another non-limiting example, if a particular processing flow for a particular computing operation is intended to include a sequence of 40 different components 112 and the flow identifier value indicates that the flow stopped at the 15th component—component 112M—this component 112M may be identified as a potential source of the failure. In various embodiments, this may enable problematic components 112 to be identified and remedied more quickly than using prior techniques, thereby improving the operation of the server system as a whole.

If, however, the return code 230 indicates that the requested operation was successfully performed, the flow analysis module 130 may determine an appropriate flow state determination 240 by comparing a flow signature value 220 to the flow signature data 144 to determine whether the flow signature value 220 matches a flow signature value 220 generated during the prospecting operations. If there is such a match (indicated by State 1 in FIG. 3), that flow signature value 220 may be said to be "expected" because it matches a flow signature value for a processing flow that was deemed to be permissible by the flow prospecting module 120 during prospecting. In FIG. 3, for example, in response to determining both that the return code 230 indicates the requested operation was successful and that the flow signature value 220 matches a flow signature value previously generated during the prospecting operation, the flow analysis module 130 may generate a flow state determination 240A indicative of this result. As noted above, in various embodiments the flow analysis operations include tracking the number of times that different processing flows are used during a given time interval. For example, in FIG. 3, based on a determination that the processing flow was successful (based on return code 230) and that the flow signature value 220 was "expected," the flow analysis module 130 increments a counter associated with the flow signature value 220 that tracks the number of times that flow signature value 220 was generated during a particular time period.

In various embodiments, the flow analysis module 130 may be operable to detect "unexpected" processing flows performed by the server system 110. For example, if there is not a match between the flow signature value 220 and any of the flow signature values generated during prospecting (indicated by State 2 in FIG. 3), that flow signature value 220 may be said to be "unexpected" because it does not match a flow signature value for a processing flow that was deemed to be permissible by the flow prospecting module 120 during prospecting. In FIG. 3, for example, in response to determining that the return code 230 indicates the requested operation was successful and that the flow signature value 220 does not match a flow signature value 220 previously generated during the prospecting operation, the flow analysis module 130 may generate a flow state determination 240B indicative of this result. In the depicted embodiment, for example, this flow state determination 240 may be provided to an experience impact analysis 325 for further investigation. For example, this unexpected processing flow could correspond to a malicious operation that was successfully performed via the server system 110, or the unexpected processing flow could simply correspond to a computing operation that was not yet discovered during the prospecting phase. By autonomously identifying and flagging these processing flows for further investigation, the disclosed techniques enable for the fast and computationally efficient resolution of potential problems as those problems arise. Further note that, in various embodiments, the flow analysis operations also include tracking the number of times that "unexpected" processing flows are detected. For example, in FIG. 3, the flow analysis module 130 increments a counter associated with the "unexpected" flow signature value 220 to track the number of times that this flow signature value 220 was generated during a particular time period.

Information about an occurrence of the flow signature value 220, including the flow signature value 220, the return code 230, a timestamp, the counter, etc., may be stored as part of flow signature data 144. Such information may be particularly useful, for example, in detecting changes in velocity associated with various processing flows (both "expected" and "unexpected") utilized in the server system 110 over time. For example, in some embodiments, the flow analysis module 130 may track the number of times a particular processing flow is used, by the server system 110, during successive time intervals and identify changes in that processing flow's use over time. This information may be valuable on its own, providing the organization operating the server system 110 with insight regarding how frequently the different processing flows are used and how that use changes over time.

Further, in some embodiments, the flow signature values 220 or velocity information may be used to detect changes in processing flows or the respective components 112 included therein. For example, in some embodiments, the components 112 included in a given processing flow may change and, when this change occurs, there will be a resulting change in the flow signature value 220 for that processing flow. By monitoring the flow signature values 220, the disclosed techniques facilitate the detection of changes in processing flows (e.g., components added to the flow, components removed from the flow, changes in the sequence of components in the flow, changes to the configuration of components in the flow, or any combination thereof). Accordingly, once a change in the flow signature value 220 has been detected, one may determine that there has been a change in the underlying processing flow, which may be investigated further. In various embodiments, detecting and identifying changes in a processing flow based on a change in its signature value is both less error-prone and less computationally demanding than other available techniques (e.g., comparing the list of component identifiers for the components included in the processing flow).

In some embodiments, the server system 110 may maintain (or have access to) a list (implemented using any suitable data structure or collection) that maps a component identifier value to a corresponding component 112. For example, this operation may be performed by component system of record 402 described below with reference to FIG. 4. In various embodiments, once it has been determined that there has been a change to the processing flow (based on a change in the associated flow signature value 220), various embodiments include determining which of the component(s) 112 in that processing flow have changed. For example, in some embodiments, this determining includes comparing the flow identifier value (e.g., the set of concatenated component identifier values) for the current instance of the processing flow to the flow identifier value for a previous instance (e.g., the most-recent previous instance) of the processing flow to determine how these values differ. Once the changed component(s) 112 have been identified, the extent of those changes may be investigated. For example, a change management system may be consulted to determine what changes were made to a given component 112 in the flow.

Various embodiments further allow the entity operating the server system 110 to define thresholds used to determine whether a change is significant enough to warrant further investigation or action (that is, if the risk posed by this change is deemed "acceptable"). For example, in some embodiments, certain important or business-critical components 112 or processing flows may be flagged (e.g., within the data structure providing the mapping of component identifier value to corresponding component 112) such that, when a change is detected in these processing flows or components 112, an indication of this change may be generated.

Note that, although only three states 320 are explicitly shown in FIG. 3, this non-limiting embodiment is depicted merely as an example and, in other embodiments, state logic 310 may reach one or more additional states based on the analysis of the flow signature values 220 and return codes 230. For example, in some embodiments one or more additional states 320 may leverage volumetric differences between the active cycle (e.g., a current time period) and results from one or more previous cycles (e.g., flow signature values 220 and return codes 230 generated during previous time periods or during prospecting). As a non-limiting example, in some embodiments the flow analysis operations may detect changes in velocity associated with one or more processing flows, where "velocity" refers to the number of times a processing flow is utilized by the server system 110 during a given cycle. Note that, in various embodiments, these other states 320 (e.g., states beyond the three depicted in FIG. 3) may add determination for reoccurrence, flapping states, and anomalous availability or security results of the flow signature values 220.

Further note that, although the flow analysis module 130 is shown as part of the reconciliation phase in the production environment, this depicted embodiment is provided as merely one non-limiting example. In other embodiments, some or all of the flow analysis operations described herein may be performed in a non-production environment (e.g., as part of the prospecting phase).

Figure 4:
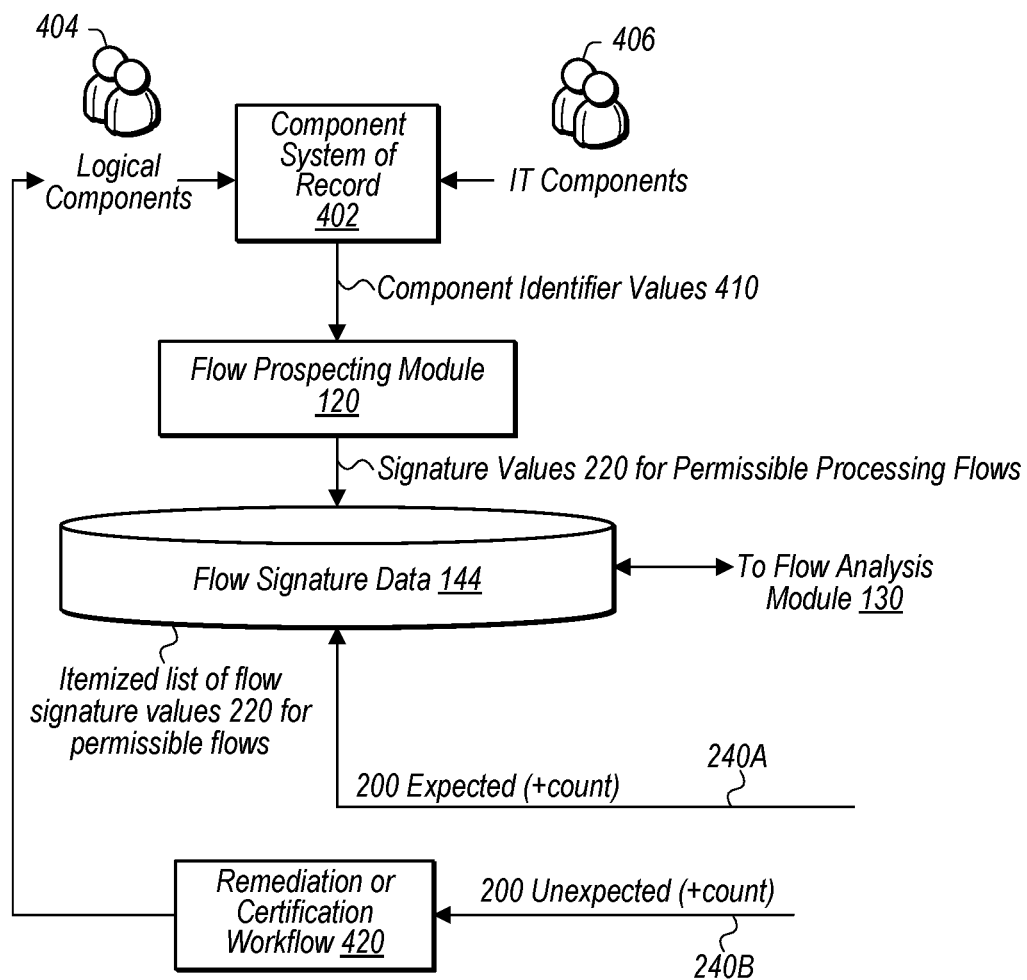
FIG. 4 is a block diagram illustrating an example flow prospecting module during a prospecting phase, according to some embodiments.

Referring now to FIG. 4, block diagram 400 depicts a flow prospecting module 120 during a prospecting phase, according to some embodiments. In various embodiments, the flow prospecting module 120 generates flow signature values 220 for the permissible processing flows that are permitted via the server system 110.

In the embodiment depicted in FIG. 4, block diagram 400 includes a component system of record 402, which, in various embodiments, is a data management system that acts as an authoritative source for data relating to the components 112 utilized by the server system 110. In various embodiments, through continued development efforts within an organization (e.g., by various software development or business teams within a company), both logical and information technology (IT) components 112 may be added to the server system 110. In FIG. 4, for example, business users 404 within the organization may develop logical components 112 and IT users 406 within the company may develop IT components 112. As these components 112 are created and on-boarded, unique, immutable component identifier values 410 for the components 112 may be added to the component system of record 402. That is, in various embodiments, as a component 112 is added to the server system 110, a unique, immutable component identifier 410B may be added to the component system of record 402 for that component 112.

In various embodiments, the flow prospecting module 120 is operable to compute flow signature values for the processing flows that are permitted, using different combinations of the components 112, via the server system 110. That is, in various embodiments the flow prospecting module 120 is a software agent that computes flow signature values 220 for any possible flow that is allowed by the configuration deployed by the users 204 or 206 of the organization operating the server system 110. For example, in some embodiments the flow prospecting module 120 takes the configuration information provided by the human users 204 or 206 and applies automation to identify every permitted sequence of components 112, generating a flow signature value 220 for each such sequence. In various embodiments, each flow signature value may be said to represent a corresponding itemized capability of the server system 110 and the sum of all of its constituent components 112 in sequential order.

In various embodiments, this process may be autonomously repeated such that, as the component system of record 402 is updated, new corresponding flow signature values 220 are created. That is, in various embodiments the flow prospecting module 120 is constantly running and generating a (potentially very large) list of flow signature values 220 (e.g., as hash values) indicative of the permissible processing flows that are possible via the components 112 in the server system 110. In some embodiments, these flow signature values 220 may be stored in tables (or in any other suitable data-storage format) and may be used, for example, by the flow analysis module 130, for example as described above with reference to FIG. 3.

As shown in FIG. 4, in various embodiments the prospecting phase receives feedback from the flow analysis module 130. In various embodiments, the flow analysis module 130 provides the flow state determinations 240 for subsequent use in the prospecting phase or for use in subsequent flow analysis operations. For example, in various embodiments the flow signature data 144 may be used to store counter information associated with the different flow signature values 220 for expected processing flows. Further, as depicted in FIG. 4, information relating to "unexpected" processing flows may be utilized by the system. For example, in FIG. 4, flow state determination 240B corresponding to an "unexpected" processing flow may be provided to a remediation or certification workflow 420 for further analysis. In some embodiments, the output of this remediation or certification workflow 420 may be utilized, for example, by business users 404 to revise aspects of one or more components 112 (e.g., logical components) used by the server system 110.

Example Method

Referring now to FIG. 5, a flow diagram illustrating an example method 500 for performing component-based risk evaluation using processing flow signatures is depicted, according to some embodiments. In various embodiments, method 500 may be performed by server system 110 of FIG. 1 to generate a flow signature value 220 based on a sequence of components 112 used, by the server system 110, to perform a requested computing operation. For example, server system 110 may include (or have access to) a non-transitory, computer-readable medium having program instructions stored thereon that are executable by the server system 110 (e.g., by one or more computer systems included in the server system 110) to cause the operations described with reference to FIG. 5. In FIG. 5, method 500 includes elements 502-512. While these elements are shown in a particular order for ease of understanding, other orders may be used. In various embodiments, some of the method elements may be performed concurrently, in a different order than shown, or may be omitted. Additional method elements may also be performed as desired.

At 502, in the illustrated embodiment, the server system 110 provides a service that is usable to perform various computing operations for requesting users 106. As described above, in various embodiments the server system 110 includes a set of (potentially numerous) components 112 that have corresponding unique component identifier values. In various embodiments, different combinations of the components 112 are usable to perform the various computing operations included in the service hosted by server system 110.

At 504, in the illustrated embodiment, the server system 110 receives, from a client device 102, a request to perform a particular computing operation. As a non-limiting example in embodiments in which the server system 110 hosts an online payment service, the requested computing operation may be to transfer funds from one user account to another. At 506, in the illustrated embodiment, the server system 110 performs the particular computing operation via a particular processing flow. In various embodiments, the processing flow includes a particular sequence of components 112 performing a series of tasks that are associated with the particular computing operation.

At 508, in the illustrated embodiment, the server system 110 generates a particular flow signature value 220 for the particular processing flow. In FIG. 5, element 508 includes sub-elements 510-512. Note, however, that this embodiment is provided merely as one non-limiting example and, in other embodiments, generating the particular flow signature value for the particular processing flow may include additional or different sub-elements than those shown in FIG. 5. At 510, in the illustrated embodiment, the server system 110 generates a flow identifier value for the particular processing flow by combining component identifier values for the particular sequence of components used to perform the series of tasks. At 512, in the illustrated embodiment, the server system 110 performs a hash operation based on the flow identifier value to generate the particular flow signature value. As a non-limiting example, in some embodiments the flow signature value is generated as an md5 hash value, though any suitable hashing technique may be used, as desired.

As noted above, various disclosed embodiments include performing flow analysis operations based on the flow signature values generated by server system 110. In various embodiments, method 500 may include one or more such flow analysis operations. For example, in some embodiments, method 500 includes determining that the particular flow signature value for the particular processing flow matches a previously generated flow signature value (e.g., generated during a prospecting phase) corresponding to a permissible processing flow that is permitted by the server system 110 and, in response, incrementing a counter associated with the particular flow signature value. In such embodiments, the counter may indicate the number of times, during a particular time period, that the particular processing flow was utilized by the server system 110.

Further, in various embodiments, method 500 includes flow analysis operations related to tracking the "velocity" associated with one or more processing flows utilized by the server system 110. For example, in some embodiments method 500 includes the server system 110 generating, during a first time period, a plurality of instances of the particular flow signature value while servicing repeated requests, from a plurality of users, to perform the particular computing operation, and, for each of the plurality of instances, incrementing a counter indicating a number of times, during the first time period, that the particular processing flow was utilized by the server system. In such embodiments, method 500 may further include comparing the first counter to a second counter associated with the particular flow signature value, where the second counter indicates a number of times, during a second time period, that the particular processing flow was utilized by the server system 110 and, based on the comparing, detecting a change in frequency of the particular processing flow between the first and second time periods.

Additionally, in various embodiments, method 500 includes determining that a particular flow signature value does not match any signature values included in a list of previously generated (e.g., during a prospecting phase) flow signature values corresponding to permissible processing flows that are permitted by the server system 110. For example, as described above, in some embodiments the flow analysis module 130 may determine that a processing flow is "unexpected" in response to the corresponding flow signature value 220 not matching any of the flow signature values generated by the flow prospecting module 120 during its prospecting operations.

In some embodiments, method 500 includes detecting when a requested operation was not successfully performed. For example, in some embodiments, method 500 includes detecting, based on a return code 230 associated with the particular flow signature value 220, an unsuccessful outcome of the particular computing operation and, in response to the detecting, identifying a particular component, of the particular sequence of components, as a point of failure for the particular processing flow. In some embodiments, for instance, identifying the particular component includes determining a final component identifier value included in the flow identifier value for the particular processing flow and, using this final component identifier value, identifying a final component in the particular sequence of components used in the particular processing flow.

Further, as noted above, in various embodiments method 500 includes performing various prospecting operations (e.g., by a flow prospecting module 120). In some such embodiments, method 500 includes accessing a set of component identifier values associated with a set of components utilized by the server system 110 to provide the service and generating a list of flow signature values corresponding to permissible processing flows that are permitted using the different combinations of the plurality of components in the server system. In some such embodiments, method 500 further includes autonomously generating the updated list of flow signature values on a periodic basis, including by accessing an updated set of identifier values associated with an updated set of components utilized by the server system to provide the service and generating a corresponding updated list of flow signature values corresponding to permissible processing flows that are permitted using different combinations of the updated set of components.

While the generation of a processing flow signature value provides a way to quantify and ascertain risk for various systems or services that allow continuous alteration of components within the systems, this assessment does not provide visibility into the risk associated with individual entities (e.g., users, employees, customers, etc.) accessing the system. For example, an entity may request to generate or execute the processing flows, to access resources, to participate in experiences provided by the system, to participate in transactions, etc. While the system discussed above with reference to FIGS. 1-5 automatically quantifies risk for a processing flow, this system does not provide techniques for quantifying risk associated with the individual themselves, the type of risk, the asset they are attempting to access, etc.

The techniques discussed below with reference to FIGS. 6A-11 involve detection of risk associated with end users attempting to access the disclosed server system. User risk assessment is performed by assigning identities to individual end users interacting with the server system. For example, the disclosed techniques detect whether a person requesting to access the system is risky prior to allowing them to access various system resources. As one specific example, the system determines whether the person has performed risky actions in the past based on assigning identities to the person according to what they are attempting to access as well as authorities granted to this user (e.g., what have they previously been allowed to access within the system). As discussed in further detail below with reference to FIGS. 8 and 9, in some embodiments, user identity risk techniques may be utilized in combination with the signature flow value risk techniques discussed above with reference to FIGS. 1-5.

In order to detect risk associated with an end user submitting a request, a server system assigns one or more identities to the end user. For example, a user John Smith may open an onboarding human resources user interface via the server system and enter their first and last name into the interface. In this example, the server system generates and assigns a birthright identity of "J" to John. John customer service agent. On the backend, when John requests to access an application (which may be referred to as a request to access an "asset"), the system loops through its authorization framework and assigns a "role" (an identity of John corresponding to the access request) and determines which type of customer service agent John is (e.g., either a developer agent or a customer service assistant). Based on determining that John is a developer agent, the system automatically generates a role identity that is assigned a higher risk score than the birthright identifier assigned to John. The server stores both identities in a database. Generally, the system assigns lower risk scores to birthright identifiers than risk scores assigned to other types of identities (such as the developer agent identities). This is due to birthright identities presenting minimal risk relative to other types of identities (but are still associated with some risk since they might be phished). Throughout John's interactions with the system, he is assigned different identities by the system which are maintained in an identity database along with individual identity risk scores; however, the different identities of John may only be used during an overall risk evaluation of John when they are enabled. In order to submit a request to access an application, the user simply provides a username and password (i.e., the user is not necessarily required to know the number, types, etc. of identities assigned to them).

As used herein, the term "identity" is intended to be construed according to its well-understood meaning, including establishing and highlighting details about a user via a label. For example, in disclosed techniques, an identity assigned to a user may be a birthright identity. In disclosed techniques, a birthright identity is generally generated based on a user's first and last name as well as a login identifier (ID) of the user. In various embodiments, a given identity allows a user to perform certain actions when interacting with a server system providing various services. For example, a user with a first type of identity may be able to access sensitive data, while a user with a second, different type of identity may not be able to access the sensitive data. In this example and in disclosed techniques, the first type of identity may be associated with greater risk than the second type of identity. In some situations, an assigned identity includes key or token materials. For example, an identity that includes token materials may include an ephemeral token that is distinct to a given application session, user session, authorization process, etc. As another example, an identity that includes key materials may include key materials from: a service account (which binds an application to a given host computer), an open authentication account (e.g., a backend application account), a certificate used in securing ingress (e.g., ingress of data for a given service of the disclosed system).

As used herein, the term "asset" refers to a resource provided by a server system. For example, an asset may be a physical asset or a logical asset. Physical assets are assigned and tracked by the server system and may include computer components (e.g., memory, load balancers, compute nodes, network routes, central processing units (CPUs), etc.), while a logical asset may include a newly created account, an existing account, a piece of software, a product that uses multiple computer components (e.g., memory, load balancers, applied product logic, compute nodes, etc.) of the system, etc. For example, if a user is requesting to access an asset such as a product, this product may be a PayPal application that allows users to participate in transactions. In some embodiments, assets are of a mixed type including both software and hardware elements.

In some embodiments, in addition to assigning identities to users, the server system assigns risk types to different identities, assets, employees, identity roles, etc. As used herein, the term "risk types" refers to different categories of threat presented by different system elements. For example, there may be different identity risk types such as a "token" identity risk type assigned to an identity that includes a token. In this example, the token identity risk type may be associated with a certain amount of risk (and assigned a corresponding risk score). In disclosed techniques, "types" are assigned to different system elements corresponding to a client request in order to provide context during risk assessment and mitigation (e.g., how bad, fraudulent, malicious, or dangerous are computer operations to be performed in response to the client request?). For example, an identity of "_name_" and a type of "admin" assigned to a given user request provide a means for codified operations to distinctly evaluate risk for different "types" in accordance with known risk corresponding to a given "type."

The disclosed risk evaluation techniques may advantageously quantify risk associated with different elements corresponding to a request submitted by a client device. For example, in addition to the techniques discussed above with reference to FIGS. 1-5 that advantageously quantify risk associated with the constant changes to components in the system using processing flow signature values to monitor and analyze processing flows utilized by the system to process client request, the techniques discussed below with reference to FIGS. 6A-9 quantify risk associated with different privileges (e.g., actions they are able to perform, data they are able to access, etc. within the system) of a given user submitting a request by assigning different identities to the user according to their privileges. Further, the disclosed techniques provide a method for quantifying risk associated with different assets, experiences, employees, etc. corresponding to submitted requests to be process. Still further, the disclosed system provides granular quantification of risk associated with different elements corresponding to a request by assigning different risk types to these elements in order to more accurately score the different elements for risk determination. Such techniques may advantageously allow systems to accurately identify (and potentially reject) risky requests. This, in turn, may reduce or prevent loss (e.g., of computational resources, financial resources, private user data, etc.) associated with risky (and potentially malicious) requests that are mistakenly approved.

In some embodiments, the disclosed techniques evaluate risk occurring in an enterprise system. As such, the disclosed techniques may advantageously evaluate risk of concurrent changes within an enterprise by assessing different states of elements involved in these changes. For example, as business development and changes to software of the enterprise occur at different points in time, such changes may effect one another due to dependencies between different configuration items during experiences occurring in different instantiated states for these configuration items. The disclosed techniques may advantageously identify and mitigate risk associated with such changes by using multiple layers of finite state machines that do not require management and maintenance.

Figures 6A, 6B:
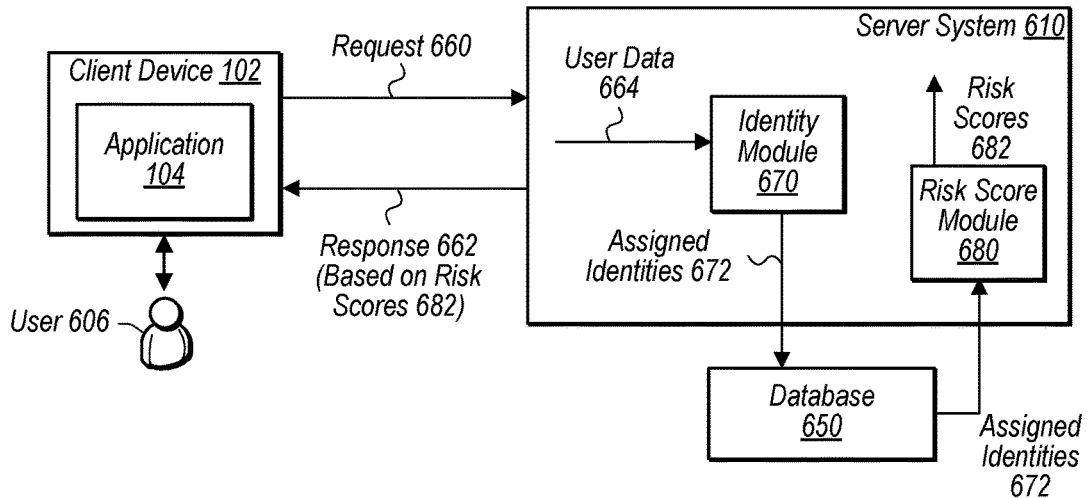
FIG. 6A is a block diagram illustrating an example system configured to assign identities to one or more end users and determine risk scores for the identities, according to some embodiments.
FIG. 6B is a block diagram illustrating an example identity database, according to some embodiments.

Turning now to FIG. 6A, a block diagram illustrating an example system configured to assign identities to one or more end users and determine risk scores for the assigned identities is shown. In the illustrated embodiment, system 600 includes a client device 102, which includes application 104, database 650, and server system 610, which in turn includes identity module 670 and risk score module 680.

In the illustrated embodiment, client device 102 receives input from a user 606 via application 104 (discussed above with reference to FIG. 1). Client device 102 generates and transmits a request 660 to server system 610 based on the input from the user. For example, user 606 may request to initiate an electronic communication (e.g., a transaction) via application 104 (e.g., a PayPal application) downloaded on their smart phone (one example of device 102). In this example, device 102 transmits a request to system 610 to process the initiated electronic communication.

Server system 610, in the illustrated embodiment, receives user data 664 associated with the request 660 and inputs this information into identity module 670. For example, user data 664 may include the name, username, password, etc. of the user 606, the type of device 102 utilized by the user to submit the request, a type of application 104 accessed by the user 606, etc. Based on this information, identity module 670 generates and assigns identities 672 to the user 606. After generating one or more new identities, identity module 670 assigns them to user 606 and stores them in database 650. For example, a given user (e.g., user 606) may be assigned 1, 10, 100, etc. identities which are stored in database 650. Server system 610 may store other information associated with the newly generated and assigned identities in database 650. As discussed in further detail below with reference to FIGS. 7A and 7B, identities may be assigned a given "type" that is based on known risk. For example, a user accessing a given application may have certain permissions and privileges in terms of accessing data or assets of the disclosed system and it is these permissions and privileges that dictate a known risk for a given identity "type." Furthermore, the combined enabled identities of a given user in addition to the type of resources being interacted with and the types of resources that the different identities are authorized to access at the time which assists the disclosed system in defining potential risks may negatively affect the system the user is requesting to interact with. In short, enabled identities and resources authorized for access for a given user are leveraged during risk assessment to determine a risk state for the user interacting with assets of the system.

In some embodiments, previously generated identities that have been assigned to the user 606 are stored in database 650. For example, server system 610 may access database 650 based on a name of the user 606 to locate existing or newly assigned identities (newly assigned by module 670 after receiving request 660) corresponding to this user. In the illustrated embodiment, server system 610 retrieves various assigned identities 672 from database 650 (whether they are newly assigned or existing identities) and inputs the identities into risk score module 680. For example, in some situations, a given identity assigned to user 606 and stored in database 650 may be disabled, indicating that the user is not currently able to perform actions associated with this identity (and, thus, this identity does not currently apply to the user). For example, an identity may only be included in a risk evaluation performed by system 610 for user 606 if the identity is enabled. In this example, a risk score assigned to an identity that is disabled may not be included in an overall risk score calculated for a user request even though that risk score may still be calculated for the identity and stored for use in potential future requests originating from this user. In scenarios with disabled identities, system 610 may only be concerned with identities 672 assigned to the user that are currently enabled.

Risk score module 680 in the illustrated embodiment receives assigned identities 672 (e.g., enabled identities). Risk score module 680 determines and outputs risk scores 682 for the identities. For example, risk score module 680 may assign risk scores to identities based on the amount of damage a user may be able to cause when performing actions within system 610 granted via their assigned identities. For example, a user that has access to private data may be able to execute malicious activity that has a greater negative impact than a user that does not have access to the private data at all. Further, if a user is associated with previous malicious activity within the system, then one or more of their assigned identities may be assigned a higher risk score than users that do not have a history of malicious activity. In such situations, system 610 may access an activity history of the user (e.g., stored in database 650 or another database) and feed this information into risk score module 680 in addition to identities 672 assigned to this user. In this way, risk score module 680 may use this additional user information to calculate risk scores for the user's identities.

In some embodiments, risk score module 680 uses a trained machine learning model to determine risk scores for assigned identities 672. For example, risk score module 680 may input assigned identities 672 for a given user as well as an activity history of this user into a machine learning model trained to identify risk associated with different types of identities and historical user activity. The trained machine learning model, in this example, may output risk scores for respective identities 672 assigned to this user or may output classifications indicating a confidence of the model that the identities are associated with high risk. If the model outputs classifications, then risk score module 680 generates risk scores for identities 672 based on the classifications output by the machine learning model. For example, if the model outputs a classification of 0.1000 (on a scale of 0.0000 to 1.0000), risk score module 680 may assign a low risk score to the identity corresponding to this classification. In contrast, if the model outputs a classification of 0.8000, risk score module 680 may assign a high risk score to the identity corresponding to this classification.

In some embodiments, system 610 generates a response 662 based on risk score 682. For example, server system 610 may determine that the user's request 660 should be authorized based on the risk scores 682 being below one or more predetermined risk thresholds. For example, each identity type may be associated with a different predetermined risk threshold. In this example, system 610 may compare a risk score for a first identity type with the corresponding predetermined risk threshold. In some embodiments, the one or more predetermined risk thresholds are set by an administrator of server system 610. In other embodiments, server system 610 determines predetermined risk thresholds using a machine learning model trained on different risk scenarios. For example, a machine learning model may be trained using an identity risk score threshold by inputting identity risk scores for different identities that have been labeled either risky or not risky. Based on the plurality of labeled identity risk scores, the model will learn an identity risk score threshold. Once trained, the identity threshold machine learning model will receive a plurality of identity risk scores for newly assigned (unlabeled) identities and will output an identity risk threshold. This identity score threshold may be personalized to a given user (when the model receives identity risk scores for a given user) or may be a general identity risk score threshold applicable to various different users (when the model receives identity risk scores for identities newly assigned to a plurality of different users). Similar techniques may be used to generate predetermined risk score thresholds for other elements associated with client requests, such as a signature flow risk score threshold, an asset risk score threshold, an identity type risk score threshold, etc. In some embodiments, the one or more predetermined risk thresholds are set by the server system based on service-level agreements (SLAs) with different entities utilizing resources of the server system. For example, a given client entity (e.g., a merchant) may specify risk tolerance guidelines for its clients. In this example, when the clients of the entity access the server system, their requests may be evaluated according to thresholds that are predetermined based on risk tolerance guidelines specified in the service-level agreement of this entity.

In some embodiments, server system 610 generates an overall risk score for request 660 based on the individual risk scores 682 output by module 680 for identities 672 that are assigned to user 606. In such situations, server system 610 may compare the oval risk score with a predetermined risk threshold. Server system 610, in the illustrated embodiment, sends a response 662 (generated based on risk score 682) to client device 102. Client device 102 may, in turn, display a message to user 606 via application 104 and an interface of device 102 indicating that their request 660 has been authorized. In some embodiments, response 662 (generated based on risk score 682) may include a request for a factor in a multi-factor authentication procedure or may include a request for additional login information. In other embodiments, in addition to authorizing a request received from client device 102, server system 610 may decrease authentication procedures for future requests received from client device 102 based on risk scores in a risk vector for a current request received from client device being below a predetermined risk threshold. Such techniques are applicable to both identities assigned to users and identities assigned to assets and configuration items FIG. 6B is a block diagram illustrating an example identity database. In the illustrated embodiment, an example database 650 storing various identities assigned to different users is shown. Database 650 includes several columns: user's name 664A, an indicator 664B showing whether an identity is enabled, a number of attempts 664C, an identity type 674, an as signed identity 672, and a risk score 682 assigned to the identity.

The user's name 664A column includes values indicating a name of the user corresponding to different assigned identities 672. For example, the first row in database 650 includes information for a user named "Anastasia." The identity type 674 column includes values indicating a type of identity that has been assigned to different users. Following the earlier example, Anastasia is assigned an identity that is of type "birthright" which may also be referred to as a login ID. The attempts 664C column includes entries corresponding to each assigned identity 672 that indicates a number of times the user 606 has attempted to use this identity (e.g., when they are attempting to access data, an asset, complete a transaction, alter sensitive data, etc.). For example, user 606 may attempt to access private data stored by server system 610 using their birthright identity; however, this attempt to access the private data will likely fail due to the birthright identity not including privileges granting access to the private data. The assigned identity 672 column indicates the identity itself. For example, Anastasia is assigned two different identities: a birthright identity of "A" and a work personal computer (PC) identity of "192.158.1.38." In some embodiments, database 650 includes an additional column indicating applications, certifications, or keys assigned to the different user identities. For example, these certifications or keys may indicate relationships between different elements corresponding to a given client request. For example, relationships between a user which is assigned a given identity and experiences accessed by the user using one or more of these identities may be shown.

The indicator 664B shows whether an identity is currently enabled for this user. For example, Katherine has a mobile device identity that is not currently enabled. In this example, Katherine may not be authorized to use her mobile device to interact with server system 610 and, thus, this identity is not currently enabled. In some situations, an identity is disabled in response to this identity being misused by the user (e.g., the user performs suspicious or malicious activities using privileges provided by a given identity). Database 650 further includes a risk score 682 column that indicates a risk score assigned by risk score module 680 to the various identities stored in database 650. For example, user Dima has an administrator identity that is associated with the highest amount of risk, with a risk score of 16.5, while Anastasia's birthright identity is associated with the lowest amount of risk, with a risk score of 2.1.

In some embodiments, server system 610 assigns authentication procedures to or performs authentication procedures for different elements associated with client requests. For example, server system 610 may assign an authentication procedure to Dima's administrator identity based on this identity having access to a larger number of privileges than Anastasia (e.g., Dima may access a greater amount of data than Anastasia). In this example, server system 610 may execute an authentication procedure (e.g., requesting that Dima provide one or more authentication factors) prior to determining a risk score for a request received from Dima. In other situations, server system 610 may execute the authentication procedure instead of calculating a risk score for Dima. Based on the results of the authentication procedure, the server system 610 may determine whether to approve or deny the request received from Dima.

In some embodiments, database 650 includes links indicating relationships between different identities of a given user. For example, when Anastasia first accesses server system 610, she is assigned her birthright identity "A," but this identity does not allow her to access private data within system 610 yet. In order to do this, Anastasia needs to utilize an employee identifier that has access to more information within system 610. So, in this example, when Anastasia requests to access private data, identity module 670 provisions an administrator identity (which may include a password as well that needs to be entered by Anastasia to access the data). In this example, however, if Anastasia requests to send the private data outside of system 610 (e.g., sending files to a business outside of a current business within system 610 via a message), then she will be provisioned two additional new identities: an administrative identity and an external messaging identity. In this example, Anastasia has four identities that are linked to one another: a birthright identity, an administrator identity, an external messaging identity, and a work PC identity. Further in this example, Anastasia may be associated with a high overall risk score (due to the high risk scores of her individual identities) relative to other user's that do not have access to sensitive data or the ability to share this data outside of the system 610. Anastasia's overall risk score may be determined based on observing all of her different identities stored within database 650 based on their links.

In various embodiments, server system 610 executes a plurality of finite state machines (FSM) (which may also be referred to herein as "modules") that automatically gather data for various different users as they access and utilize different elements of the system. In some situations, a finite state machine is made up of a plurality of different "modules." In some situations, a finite state machine that executes via a single module may receive risk data from another finite state machine (running asynchronously) that executes via multiple different modules. For example, the plurality of different finite state machines may gather data for system 610 including identities, component processing flows (e.g., for experiences as discussed above with reference to FIGS. 1-5), assets (discussed below with reference to FIGS. 7A and 7B), identity risk types, asset risk types, employee risk types, identity role risk types, etc. and may interact with one another via the disclosed server system 610 to combine risk information for a given client request. The number of finite state machines maintained and executed by server system 610 is scalable (e.g., may be increased or decreased based on the number of client requests received at any given time). For example, identity module 670 is one example of the plurality of finite state machines that may be utilized by server system 610 to gather data for risk decisioning. As one specific example, within 60, 90, 180, etc. seconds of an observed risk event (e.g., a user requests to send a set of files outside of their company), the plurality of finite state machines of server system 610 will execute (e.g., the FSM will execute in parallel) to gather intelligence about the state of the instantiated risk event as discussed in further detail below with reference to FIGS. 7A-9.

Figure 8:
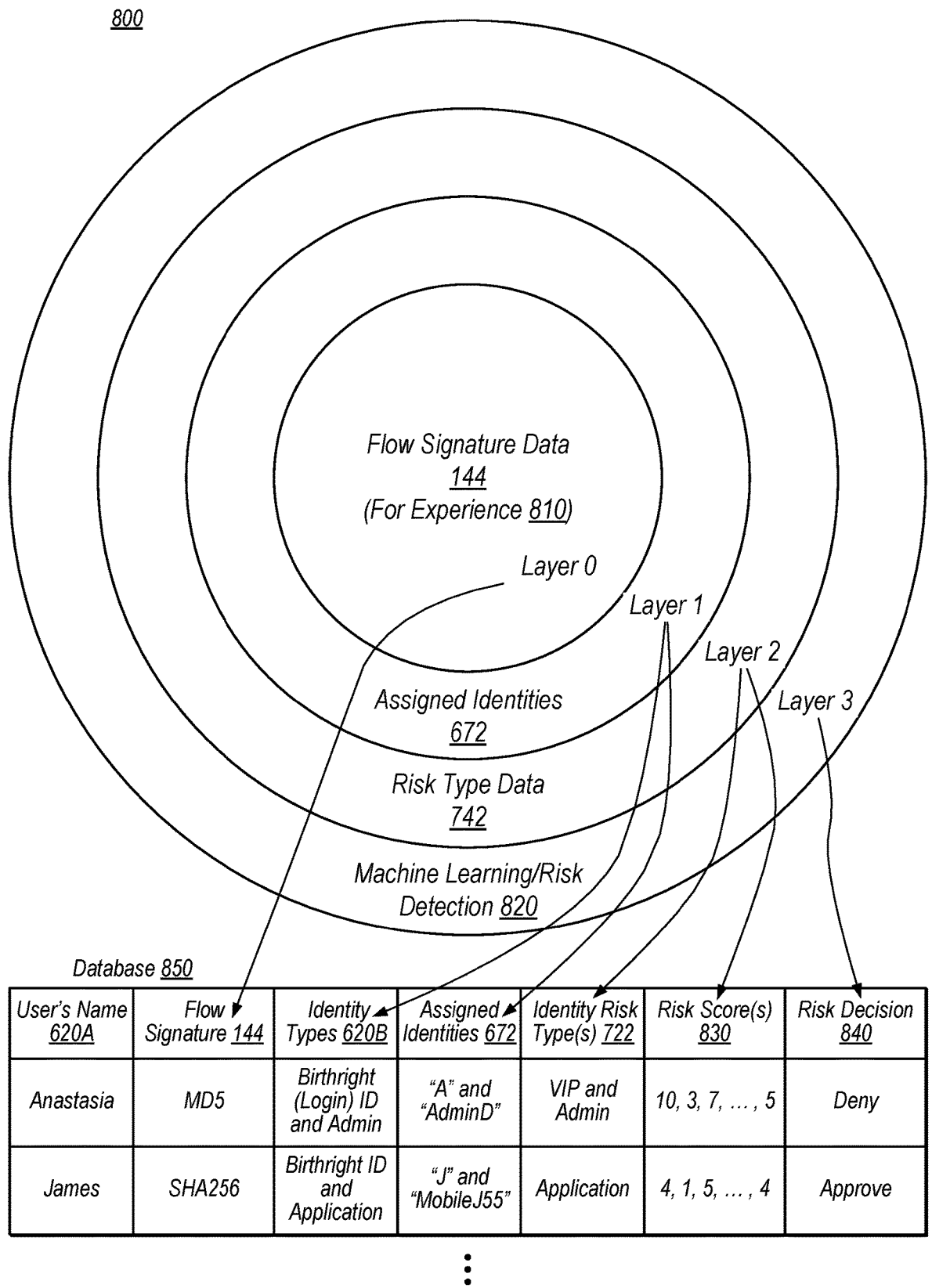
FIG. 8 is a block diagram illustrating example layers of a system configured to determine an overall risk score for a request from a client device, according to some embodiments.
Figure 9:
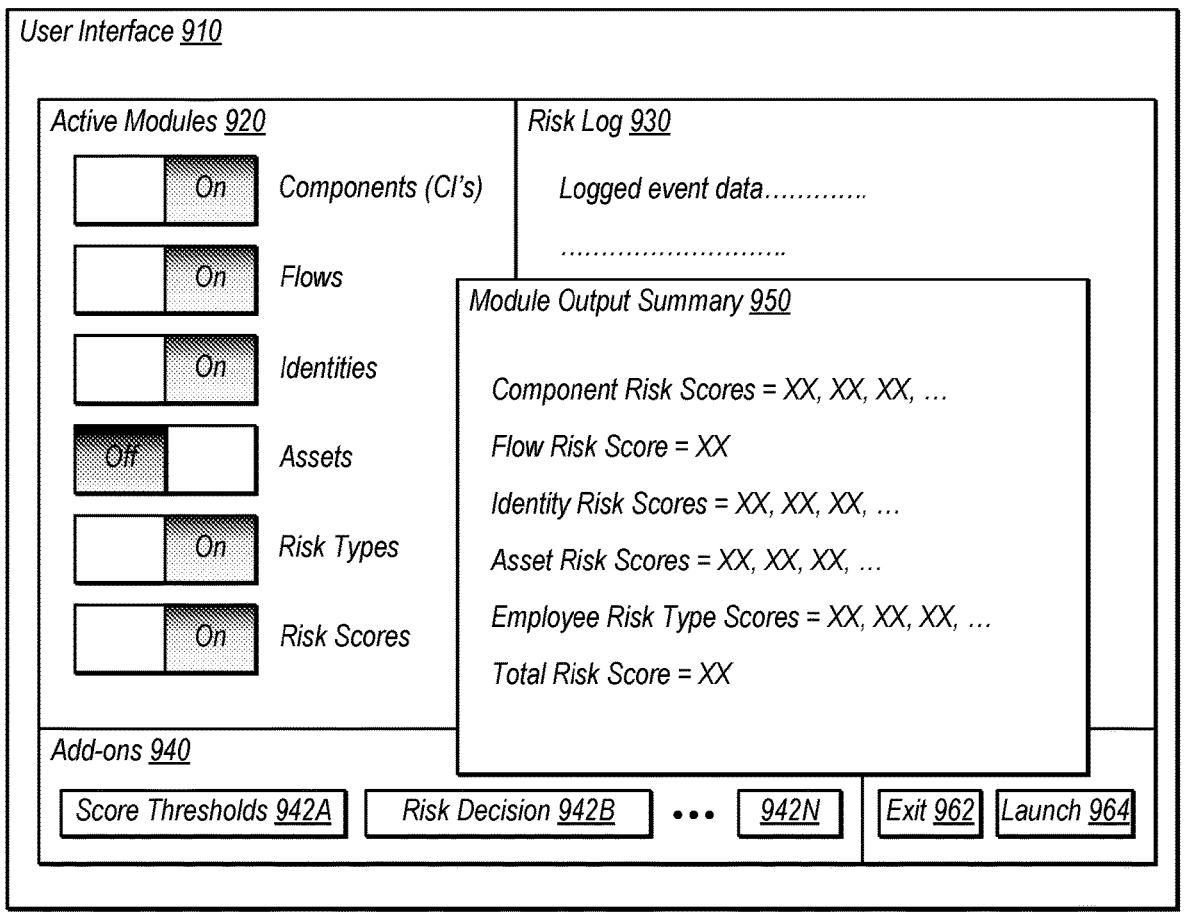
FIG. 9 is a block diagram illustrating an example user interface for manipulating and viewing risk detection results, according to some embodiments.

In disclosed techniques, FSM are managed by via a graphical user interface (GUI) such as the interface 910 shown in FIG. 9. For example, the FSMs are controllers that operate across the different risk layers shown in FIG. 8. Further in this example, the FSM have access to various backend resources, including databases, publication queues, web sockets, etc. which are shared across the FSMs. For example, each controller (FSM) implements a shared code base and performs tasks based on the role assigned to them via the program code. As one specific example, the disclosed system may spawn controllers needed for publication and queue mangers in order for these controllers to pull tasks from a queue.

FIG. 7A is a block diagram illustrating an example system configured to assign risk types to various elements corresponding to a request and determine risk scores for the request. In the illustrated embodiment, system 700 includes client device 102, which includes application 104, risk type database 750, and server system 710, which in turn includes risk type module 740 and risk score module 780. In some embodiments, server system 710 is the same system as server system 610. For example, server system 710 may include and execute identity module 670, risk score module 680, risk type module 740, and risk score module 780. Further in this example, server system 710 may access both database 650 and risk type database 750 or may access a single database storing both identity information and risk type information. As risk data is gathered for a given client request by server system 710, this data is compared with expected risk (e.g., to identify abnormalities which may indicate higher risk for the given request), the risk data is gathered into a single vector for efficient risk evaluation for the given request, and multiple different risk vectors for multiple different client requests may be combined for evaluation. For example, all of the risk vectors for requests for a given client device may be combined to evaluate the overall risk for this client device (or the user utilizing this device).

Similar to the embodiments discussed above with reference to FIG. 6A, in FIG. 7A client device 102 receives input from one or more users 706 via application 104 and transmits a request 760 to server system 710. For example, a user 706 may be an employee of a company utilizing services provided by server system 710 (which may be an enterprise system) that requests to utilize an asset (e.g., an account, a piece of software, etc.) of system 710. Server system 710, in the illustrated embodiment, performs a risk evaluation of the user request 760 and transmits a response 762 to client device 102 based on the evaluation.

In the illustrated embodiment, server system 710 inputs user data 764 into risk type module 740. Similar to the discussion above with reference to FIG. 6A, user data 764 may include various information about the user 706, the user's device, the user's activity history, etc. This information may be received from client device 102 or may be retrieved by server system 710 from as database storing historical information about the user 706, including previous activity of the user within system 710. Risk type module 740, in the illustrated embodiment, generates and assigns risk types 742 to different element corresponding with the user request 760. For example, risk type module 740 generates a risk type 742 for one or more identities (of the user 706) corresponding to request 760, a risk type for an asset requesting to be accessed via request 760, a risk type for the type of employee that user 706 is, a risk type for the identity roles corresponding to one or more identities of the user 706. Risk types 742 are discussed in further detail below with reference to FIG. 7B. Server system 710, in the illustrated embodiment, stores the risk types 742 generated by risk type module 740 in risk type database 750. In various embodiments, the risk quantified for a given user is multi-fold. In the example of the risk type 742 assigned to the employee identity of the user 706, the risk for this user is twofold. For example, the system evaluates and quantifies the risk of different enabled identities assigned to this user as well as evaluates and quantifies risk for the employee type of the user who submitted the request. Risk scores for the different user identities and risk scores for the employee type may be stored in a risk vector for this user. In this way, server system 710 may evaluate the overall risk for a given client request based on the known, active, and enable risk attributes corresponding to this request and user.

In the illustrated embodiment, server system 710 retrieves risk types 742 from database 750 and inputs them into risk score module 780. In some embodiments, server system 710 simply takes the risk types 742 generated by module 740 and inputs them directly into module 780 instead of or in addition to storing them in database 750. Further, in such embodiments, system 710 may retrieve previously generated risk types 742 from database 750 for user 706 and use these risk types in generating risk type scores 784 for the request 760. Risk score module 780 generates risk type scores 784 for each risk type 742. In various embodiments, based on the risk type scores 784, server system 710 generates a decision for the request 760 and sends a response 762 to client device 102 indicating the decision. For example, server system 710 may reject the request 760 to access an asset of system 710 if the user 706 requesting to access the asset is associated with a high amount of risk (e.g., their risk type scores 784 are greater than one or more predetermined risk type thresholds).

In some embodiments, server system 710 generates a decision for request 760 by generating an overall risk type score for the request based on individual risk type scores 784 output by risk score module 780 for the different risk type 742 associated with the request. For example, server system 710 may add up the risk type scores 784 to generate an overall risk type score. Based on this overall risk type score satisfying a predetermined risk type score threshold (e.g., the overall risk type score is greater than the threshold), the system may determine to deny request 760. In some situations, server system 710 may adjust authentication requirements (increase the number of required authentication factors) for the client device submitting request 760 based on the overall risk type score meeting the predetermined risk type score threshold.

FIG. 7B is a block diagram illustrating an example database storing assigned risk types. In the illustrated embodiment, risk type database 750 includes several different tables: identity risk type table 720, asset risk type table 730, employee risk type table 770, and identity role risk type table 790. In other embodiments, risk type database 750 may include a single table storing the information included in tables 720, 730, 770, and 790. Further, the example risk types and risk type scores shown in database 750 are not intended to limit the scope of the present disclosure; in other embodiments, database 750 may store any of various risk types and risk type scores.

Identity risk type table 720, in the illustrated embodiment, includes an identity risk type 722 row and an identity risk type score 724 row. For example, the first column of table 720 includes a "vendor" identity risk type 722 value with a risk type score 724 of two. The third column of table 720 includes an "admin" risk type 722 with a risk type score 724 of 10. Identity risk types may include one or more of the following types: test, key, token, admin, vendor, service, and application. For example, an identity with a "test" risk type may be an identity that is being used to test various aspects of the system. An identity assigned a key or token risk type may be an identity that is being used to access different types of private data stored within server system 710 using a key or token. Similarly, an identity assigned a risk type of "application" may be an identity used by a client device to access an application.

Asset risk type table 730, in the illustrated embodiment, includes an asset risk type 732 row and an asset risk type score 734. For example, the first column of table 730 includes an asset risk type 732 value of "physical" with an asset risk type score 734 of four. Similarly, the second column of table 730 includes an asset risk type 732 of "ingress" with an asset risk type score 734 of seven. Asset risk types 732 may include the following types: physical, ingress, admin application, control point, risk view, autonomous, database, experience, and capability. For example, assets fall within different types. As one example, some assets may support certain types of accesses (e.g., web-based accesses, API accesses, administrator accesses, private data accesses, etc.) As discussed above, an asset of the disclosed system may be accessed during an experience that a user is requesting to participate in (the experience being executed by a plurality of computing nodes that make up a flow of computations). Different assets may be associated with different amounts of risk. The risk types and risk type scores generated by server system 710 attempt to quantify the different amounts of risk associated with different assets.

Employee risk type table 770, in the illustrated embodiment, includes an employee risk type 772 row and an employee risk type score 774 row. For example, the first column of table 770 includes a "customer service agent" employee risk type 772 value with an employee risk type score 774 of three. The second column of table 770 includes a "full-time equivalent (FTE)" employee risk type 772 value with an employee risk type score 774 of eight. Employee risk types may include the following types: FTE, customer service agent, very important person (VIP), guest. For example, users are onboarded into a company to fulfill assigned to perform different functions within a team or organization of the company. These teams and organizations are allocated into specific roles such as: a customer service agent (e.g., that interfaces with product customers, but do not interact with computing resources, such as configuration items, of the server system 710), a VIP (e.g., a CEO, CFO, CTO, etc. who may be associated with a great amount of risk due to these users being adversarial targets for phishing or impersonation), etc. Any of various types can be generated by the disclosed server system to classify the type of "human" that a user is (in contrast with their assigned identities). For example, understanding which assigned identity performed a given action or submitted a request in combination with an assigned employee type assists the disclosed system in identifying characteristics and patterns associated with a human identity of the user which may correspond to risky behavior.

Identity role risk type table 790, in the illustrated embodiment, includes an identity role risk type 792 row and an identity role risk type score 794 row. For example, the first column of table 790 includes a "birthright" identity risk type 792 value with an identity role risk type score 794 of one. The second column of table 790 includes a "personally identifiable information (PII)" identity role risk type 792 value with an identity role risk type score of 794 of twelve. Identity role risk types may include the following types: admin application, control point, PII, payment card industry (PCI), administrator, birthright, database, finance, data egress, and experience. Server system 710 may define a plurality of different types of identity roles. For example, a birthright role is assigned to a user when they join a company. More sensitive (e.g., risky) identity roles of different types are created such as PII, PCI, other sensitive data role types, which need authorization before an action can be performed. For example, these types of identity roles require a higher level of permission (e.g., a greater number of authentication factors) before they are allowed to be used to access sensitive data. Over time, an employee may make requests based on different roles based on mandates in their current job or a job change. As such changes occur, an employee may no longer be authorized to use one or more of their identity roles and their prior identity role may, therefore, be associated with a higher level of risk. The disclosed techniques evaluate risk for different identity roles based on e.g., which products or applications these identity roles are used to access; thus, the system knows the risk that a given user request may pose based on which identities they are leveraging to access which assets.

In some embodiments, each of the rows shown in database 750 (e.g., the identity risk type, asset risk type, employee risk type, identity role risk type) are different objects (tables) in the database which are maintained separately, but are linked to one another. In other embodiments, these rows are all included in a single database object. For example, a single table in database 750 may store risk types assigned to each identity associated with a given user as well as the risk types assigned to the assets and experiences corresponding to requests submitted by the given user. Further, the disclosed techniques may utilize object relational mapping (ORM) to programmatically generate and maintain relationships between different risk types and different system elements.

As discussed above with reference to FIG. 6B, in some embodiments, instead of (or in addition to) calculating risk scores for identities, signature processing flow values, asset risk types, employee risk types, etc. the discussed risk determination system (e.g., one of systems 110, 610, and 710) may perform authentication procedures. In still other embodiments, the server system may block a given request or user altogether based on one or more of their assigned identities, signature processing flow values, asset risk type, employee risk type, etc. For example, if an assigned identity type is known to be malicious, the server system may automatically deny a request received from a user assigned this identity type. In contrast to this example, requests initiated from users assigned a given identity type may be automatically approved.

In some embodiments, server systems 110, 610, and 710 are the same system. In such embodiments, this single system is configured to perform the operations discussed above with reference to FIGS. 1, 6A, and 7A. Turning now to FIG. 8, a block diagram is shown illustrating example layers of a system configured to determine an overall risk score for a request received from a client device using the techniques discussed above with reference to FIGS. 1, 6A, and 7A. In the illustrated embodiment, system 800 includes various layers representing the different finite state machines executable (e.g., in parallel) by system 800 to generate a risk decision based on performing different types of risk scoring for a user request based on a plurality of different elements (e.g., flow signature values, identities, identity types, assets, employees, etc.) associated with the request.

Layer 0, in the illustrated embodiment, represents the portion of system 800 that generates flow signature data 144 for an experience 810. Layer 0 is a raw layer that includes one or more finite state machines for evaluating risk and threats of instantiated configuration items as discussed above with reference to FIGS. 1-5. For example, the FSM of layer 0 collect various counts, return codes, etc. of various known configuration items. Layer 1, in the illustrated embodiment, represents the portion of the disclosed system that generates and assigns identities 672. Layer 1 includes one or more finite state machines for assigning identities to users based on various points of control (e.g., access privileges) that this user has been granted. For example, layer 1 takes data collected via controllers of layer 0 and links identities to configuration items to be used for further risk assessment and mitigation (e.g., via the controllers of layers 2 and 3). Further, in the illustrated embodiment, layer 2 represents the portion of the disclosed system that generates risk type data 742 and assigns different risk types and risk scores 830 to various elements (e.g., identities, assets, experiences, employees, etc.) associated with a received request from a client device. Layer 2 includes one or more finite state machines that assign dependencies between elements of one or more other layers (e.g., layer 0, layer 1, etc.). Layer 3, in the illustrated embodiment, represents the portion of the disclosed system that performs machine learning and risk detection operations 820 to generate risk decisions 830 for received requests. Layer 3 includes one or more finite state machines that monitor and report on changes, messaging, etc., for example, for business operations requested by various client devices.

Database 850 (one example of database 650 or database 750), in the illustrated embodiment, includes various different columns storing values generated by the layers 0-3 of the disclosed system 800. For example, database 850 shows corresponding types of encryption used to generate different flow signature values 144 within layer 0 of the disclosed system. As one specific example, Anastasia submits a request for which a flow signature value 144 is generated by layer 0 of the disclosed system using an MD5 encryption protocol. Database 850 may also store the flow signature values themselves that are generated using e.g., the MD5 and SHA256 encryption protocols. Database 850 also stores the name 620A of users from which the requests are received. Further, database 850 stores identity types 620B (such as birthright, admin, and application identities) and assigned identities 672 (such as "A" and "AdminD"). For example, identity "A" is assigned an identity risk type of "VIP," while identity "AdminD" is assigned a risk type of "Admin."

In the illustrated embodiment, database 850 stores risk types 722 for the different identities and risk scores 830 generated by layer 2 for various elements generated by layers 0-2. For example, risk scores 830 of 10, 3, 7 . . . 5, are stored for a user named Anastasia. In this example, these risk scores correspond to various elements (e.g., risk score 10 is assigned to the flow signature value 144, risk score 3 is assigned to the birthright identity of Anastasia, risk score 7 is assigned to the admin identity of Anastasia, and a risk score of 5 is assigned to the identity risk type "Admin" which is assigned to the "AdminD" identity of Anastasia. Database 850 stores risk decisions 840 generated by layer 3 of system 800 for requests. For example, system 800 generates a decision that denies the request submitted by Anastasia based on evaluating (e.g., using machine learning) the risk scores 830 assigned to various elements corresponding to the request submitted by Anastasia.

FIG. 9 is a block diagram illustrating an example user interface for manipulating and viewing risk detection results. In the illustrated embodiment, a user interface 910 of a computing device 900 that may be utilized by a system administrator or risk evaluation agent is shown. The user interface 910 includes active modules 920, a risk log 930, a module output summary 950, add-ons 940, an exit option 962, and a launch option 964. The exit user interface element 962 allows administrators to exit the risk evaluation program (which in turn may cause the user interface to close). The launch user interface element 964 may cause computing device 900 to launch additional user interfaces or computer programs to assist in evaluating risk associated with different client requests, which in turn may allow for informed decisioning for such requests. In some situations, user interface 910 displays options for controlling data stored within a code base that can be shared and deployed according to the specific needs of a given entity (e.g., company). As such, the user interface 910 and corresponding code base can be deployed and managed within a given information technology (IT) infrastructure of different companies. Individual programs, controls of which are displayed in user interface 910, may be coupled or decoupled from one another according to the personalization requests of various entities. The results from different entities may be shared with a central server system (e.g., server system 110, 610, or 710) to be utilized in future risk assessments.

The pane within user interface 910 showing active modules 920 includes options to toggle different modules of the disclosed system. For example, a risk administrator may choose not to include assets in the risk evaluation for one or more requests, but may choose to include the components (CI's), component flows, identities, risk types, and risk scores in the overall risk evaluation of a request. For example, score thresholds 942A may be added such that risk scores are compared to predetermined score thresholds set by the system administrator, risk decisions 942B may be generated and displayed for different requests, etc. An administrator may set individual risk thresholds for each of the modules 920 shown in the illustrated embodiment. Additionally or alternatively, the administrator may set an overall risk score threshold for the disclosed risk evaluation. For example, a total risk score may be calculated for a given client request and then compared to the overall risk score threshold.

The total risk score displayed in the summary 950 pane by user interface 910 may be determined by the disclosed risk evaluation system (e.g., system 800) using various different techniques. For example, a total score may be calculated for a request by determining an average (e.g., a mean, medium, median, etc.) of individual component, identity, asset, employee type, etc. risk scores for a given request. In other situations, the total score may be determined by adding individual risk scores (before being compared with an overall risk threshold). As one specific example, system 800 might output a risk vector for a client request that includes an identity risk score, an asset risk score, an identity type risk score, a component risk score, a signature flow value risk score, etc. The system 800 may perform various computations on the values included in this vector to determine an overall risk score for the client request. In some embodiments, system 800 may perform a rolling output of risk vectors for a given client request every one, two, three, etc. minutes. For example, at the time a client request is submitted, a small set of information may be available for performing the disclosed risk evaluation. The system 800 may output a first vector based on this small set of information. After two minutes have passed, a larger set of information may be available for this request and, as such, system 800 may output a new, second risk vector for the request. In this example, system 800 may calculate a total risk score for the request by averaging the values included in the first and second vector before combining the different risk score values to determine a total risk score for the request.

While the user interface 910 in the illustrated embodiment presents risk scores for various elements corresponding to a given client request, in some situations this interface may also display a visual of the individual elements themselves as well as intelligence data about the configuration item dependencies to one another that were used to derive the displayed risk scores. As such, user interface 910 may display various level of granularity and visibility for the entire risk evaluation process performed by the disclosed server system. In addition and as shown in FIG. 9, the user interface 910 allows for changes to finite state machines via selectable user interface elements (e.g., toggle buttons) to activate or inactivate different layers of the disclosed system discussed above with reference to FIG. 8.

In some embodiments, system 800 may input the individual risk scores (e.g., component risk score, flow risk score, identity risk score, asset risk score, employee risk type score, etc.) for a given request into a machine learning model. In such situations, the machine learning model is trained to determine an overall risk score for the request based on the individual scores. The output of the machine learning model may be compared to the risk score thresholds set via user interface 910, for example, to determine whether client requests should be approved or denied. In some embodiments, total risk scores for requests are compared to multiple different risk thresholds. For example, if a client device requests to make a change to a piece of code, system 800 calculates a risk score for the source code itself (the asset), a vector of identity risk scores, a risk score for a signature flow value corresponding to the code change, etc. If the user requesting to make the change is not risky (based on their identity risk scores), if the code change is not overly risky, etc., then this code change may be approved by system 800. However, if one of the asset risk score, identity risk score, the overall risk score, etc. for the code change request surpass risk thresholds of system 800, the system may deny the code change request. As one specific example, an overall risk score may be used to determine whether a user accessing a DevOps tool for data ingress is above a risk threshold (e.g., this user is malicious). All of the intelligence data gathered via layers 0-3 may be used in complex decision patterns in order to make authorization decisions for various client requests.

In the illustrated embodiment, the pane showing add-ons 940 allows a risk administrator to add further limitations or elements to the risk evaluation performed by the disclosed system. The add-ons 940 may allow administrators to customize risk evaluation processes. The pane within user interface 910 showing risk log 930 shows logged event data gathered by the active modules 920 with their toggles set to "on." For example, risk log 930 may show a number of different identities determined and assigned by the disclosed system to a given user that submitted a request (e.g., to conduct an electronic transaction, alter a piece of program code, access private user data, etc.). Further, user interface 910 may display an additional pane in the form of a pop-up window. This additional pane shows a summary 950 of the output of module 920. In contrast to the detailed information displayed by risk log 930, summary 950 displays different scores and summaries calculated by the disclosed risk evaluation system. For example, risk scores for different components, identities, assets, etc. corresponding to different client requests may be shown. In addition, summary 950 may show a total risk score calculated for a given request (or may show lots of different total risk scores calculated for different requests).

While the risk scores described herein are utilized in determining whether to authorized access and change requests, for example, the disclosed system also utilizes the gathered risk information for various elements (e.g., identities, risk types, configuration items, etc.) corresponding to different requests to generate an overall attestable risk footprint for different users, devices, accounts, etc. interacting with the disclosed system. In some embodiments, the disclosed server system uses these risk footprints for training decision models to make decisions for future requests. For example, the risk footprints may be used to train machine learning models to predict whether future client requests should be authorized.

Example Method

Referring now to FIG. 10, a flow diagram illustrating an example method 1000 for performing identity-based risk evaluation using processing risk scores for assigned identities is depicted, according to some embodiments. In various embodiments, method 1000 may be performed by server system 610 of FIG. 6A to assign identities to a user associated with a requested computing operation (which may also be performed by server system 610 or may be performed by server system 110 shown in FIG. 1). For example, server system 610 may include (or have access to) a non-transitory, computer-readable medium having program instructions stored thereon that are executable by the server system 610 (e.g., by one or more computer systems included in the server system 610) to cause the operations described with reference to FIG. 10. In FIG. 10, method 1000 includes elements 1002-1012. While these elements are shown in a particular order for ease of understanding, other orders may be used. In various embodiments, some of the method elements may be performed concurrently, in a different order than shown, or may be omitted. Additional method elements may also be performed as desired.

At 1002, in the illustrated embodiment, a server system provides a service usable to perform a plurality of computing operations for requesting users. The server system 610 may provide a service that is usable to perform various computing operations for requesting users 106. As described above, in various embodiments the server system 610 includes a set of (potentially numerous) components 112 that have corresponding unique component identifier values. In various embodiments, different combinations of the components 112 are usable to perform the various computing operations included in the service hosted by server system 610. These same component identifier values may be used by server system 610 to generate a flow signature value for a particular computing operation associated with a user request. This flow signature value may, in turn, be utilized by server system 610 to determine a risk score associated with (and ultimately a decision for) a given user request 660. The flow signature value may be assigned a risk score similar to the process of assigning risk scores to assigned identities as discussed above with reference to FIG. 6A.

At 1004, in the illustrated embodiment, the server system receives, from a client device, a request to perform a particular computing operation. In some embodiments, the particular computing operation includes one or more of the following: accessing private user data, viewing private user data, processing an electronic communication involving the user associated with the request, responding to a customer service request, and altering program code of the server system. For example, a user may request to participate in a particular experience provided by the server system. This experience may access various different assets (e.g., a transaction service) of the server system.

At 1006, in the illustrated embodiment, the server system assigns, based on a name of a user associated with the request, an identity of a first type to the user, where the first type of identity is a birthright identity. In some embodiments, the first type of identity includes key materials that the user has access to, where the key materials are usable to access one or more assets. In some embodiments, the different identities assigned to the user are linked within an identity database. In some embodiments, the first type of identity includes token materials to which the user has access. In some embodiments, the token materials are usable to access one or more assets.

At 1008, in the illustrated embodiment, the server system assigns, based on details of the request, one or more additional identities to the user, where the one or more additional identities are different identity types than the first type of identity assigned to the user. In some embodiments, the server system assigns a risk type to the first type of identity and risk types to the one or more additional identities. In some embodiments, the server system assigns risk types to one or more components included in a plurality of components that perform a series of tasks associated with the particular computing operation. In some embodiments, the server system assigns a risk type to an asset associated with the particular computing operation. For example, the server system assigns different risk types to different computing components, identities, and assets associated with a particular requested computing operation.

In some embodiments, the server system alters, based on the risk types assigned to the identities, risk scores assigned to the first type of identity and the one or more additional identities. In some embodiments, the server system assigns, based on the risk types assigned to the one or more components, risk scores to the one or more components. In some embodiments, the server system assigns, based on the risk type assigned to the asset, a risk score to the asset associated with the particular computing operation. In some embodiments, the server system generates, based on the risk scores assigned to the one or more components, the risk score assigned to the asset, and the risk scores assigned to the first type of identity and the one or more additional identities, a decision for the request, where the transmitting is further performed based on the decision. For example, the server system may score an identity that is assigned to a user prior to a risk type being assigned to this identity. In this example, once a risk type has been assigned to the identity assigned to the user, the server system may update the risk score for this user identity based on its assigned type. While the server system sees objects representing the various identities, identity types, etc. assigned to a given user, the system may present separation of final risk states (e.g., identities) when displaying this information to an end user (as shown in the example user interface 910 of FIG. 9)

In some embodiments, the server system assigns, an risk type to the user. In some embodiments, the server system generates, based on the employee risk type assigned to the user, a new identity that is based on a risk score associated with the employee risk type assigned to the user. In some embodiments, the server system performs, in response to the request to perform the particular computing operation, the particular computing operation via a particular processing flow in which a particular sequence of a plurality of components perform a series of tasks associated with the particular computing operation, where the server system includes a plurality of components with corresponding component identifier values. In some embodiments, the server system generates a particular flow signature value for the particular processing flow, including by generating a flow identifier value for the particular processing flow by combining component identifier values for the particular sequence of components used to perform the series of tasks. In some embodiments, generating the particular flow signature value for the particular processing flow includes performing a hash operation based on the flow identifier value to generate the particular flow signature value. In some embodiments, the server system detects, based on a return code associated with the particular flow signature value, an unsuccessful outcome of the particular computing operation. In some embodiments, in response to the detecting, the server system identifies a particular component, of the particular sequence of components, as a point of failure for the particular processing flow. In some embodiments, the server system determines whether the particular flow signature value matches signatures values included in a list of previously generated signature values corresponding to processing flows that are permissible by the server system, where the response if further generated based on determining whether the signature values match. For example, the server system may increase an overall risk score for the request based on the signature value for the processing flow associated with the request being risky (or prohibited altogether).

At 1010, in the illustrated embodiment, the server system scores the first type of identity and the one or more additional identities, where the scoring is performed based on accessing a risk score database storing known risk information associated with different identity types. In some embodiments, the scoring further includes inputting the risk types assigned to the first type of identity, the risk types assigned to the one or more additional identities, the risk types assigned to the one or more components, and the risk types assigned to the asset, into a machine learning model.

In some embodiments, the response is generated based on the scoring is further generated based on output of the machine learning model the classification generated by the machine classifier. The disclosed techniques may utilized any mix or combination of the risk scores it generates in determining a final risk decision for a client request. For example, when an identity of a given user attempts to access a product of the system, the system assesses the risk scores of the identity, target destination or even itself (e.g., the product is not healthy or is currently at max capacity and, thus is unable to handle new requests), or even mappings between different elements or risk scores assigned to this user.

At 1012, in the illustrated embodiment, the server system transmits, to the client device, a response to the request, where the response is generated based on the scoring. In some embodiments, the response includes an indication that the request has been authorized. In some embodiments, prior to receiving the request to perform the particular computing operation from the client device, the server system displays a user interface to an administrator of the server system. In some embodiments, the user interface includes elements selectable by the administrator to specify score thresholds for identity risk scores and risk type risk scores, whether to calculate one or more risk scores, and whether to make a final risk determination for the request. In some embodiments, when high risk users are identified by the disclosed system, security auditing for these users is programmatically increased.

Example Computer System

Figure 11:
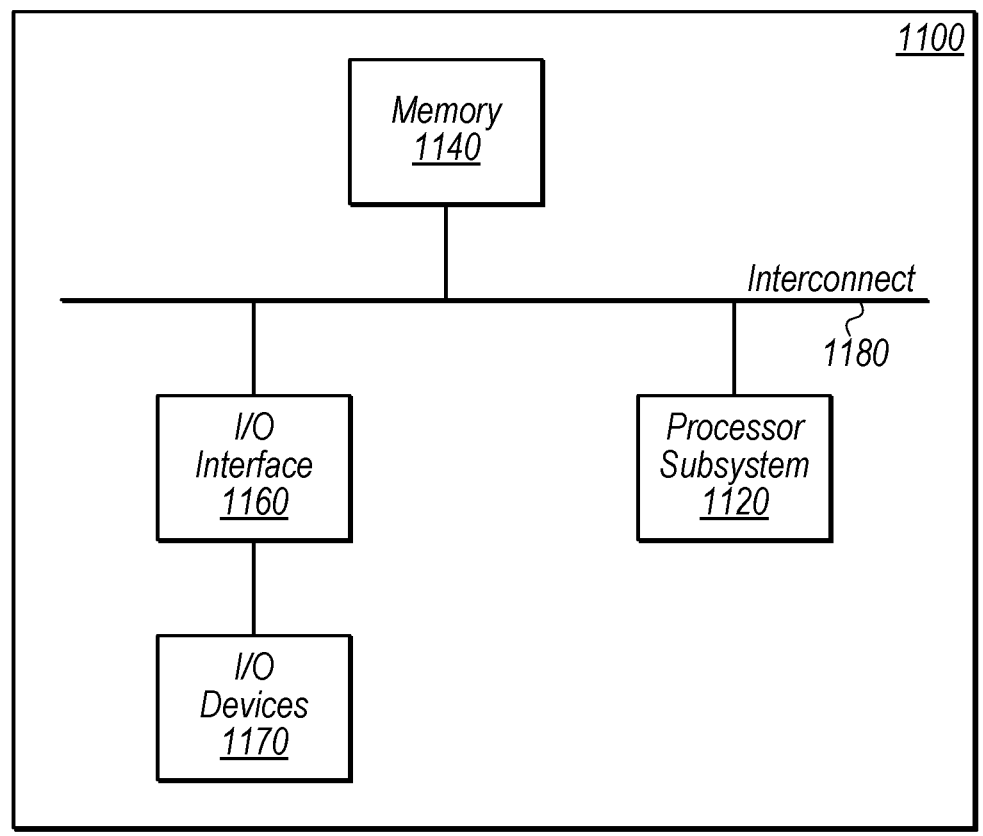
FIG. 11 is a block diagram illustrating an example computer system, according to some embodiments.

Referring now to FIG. 11, a block diagram of an example computer system 1100 is depicted, which may implement one or more computer systems, such as server system 110 (or one or more computer systems included in server system 110) of FIG. 1 or server system 610 (or one or more computer systems included in server system 610) of FIG. 6A, according to various embodiments. Computer system 1100 includes a processor subsystem 1120 that is coupled to a system memory 1140 and I/O interfaces(s) 1160 via an interconnect 1180 (e.g., a system bus). I/O interface(s) 1160 is coupled to one or more I/O devices 1170. Computer system 1100 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 1100 is shown in FIG. 11 for convenience, computer system 1100 may also be implemented as two or more computer systems operating together.

Processor subsystem 1120 may include one or more processors or processing units. In various embodiments of computer system 1100, multiple instances of processor subsystem 1120 may be coupled to interconnect 1180. In various embodiments, processor subsystem 1120 (or each processor unit within 1120) may contain a cache or other form of on-board memory.

System memory 1140 is usable to store program instructions executable by processor subsystem 1120 to cause system 1100 perform various operations described herein. System memory 1140 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 1100 is not limited to primary storage such as system memory 1140. Rather, computer system 1100 may also include other forms of storage such as cache memory in processor subsystem 1120 and secondary storage on I/O devices 1170 (e.g., a hard drive, storage array, etc.). In some embodiments, these other forms of storage may also store program instructions executable by processor subsystem 1120.

I/O interfaces 1160 may be any of various types of interfaces configured to couple to and communicate with other devices, according to various embodiments. In one embodiment, I/O interface 1160 is a bridge chip (e.g., Southbridge) from a front-side to one or more back-side buses. I/O interfaces 1160 may be coupled to one or more I/O devices 1170 via one or more corresponding buses or other interfaces. Examples of I/O devices 1170 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 1170 includes a network interface device (e.g., configured to communicate over Wi-Fi, Bluetooth, Ethernet, etc.), and computer system 1100 is coupled to a network via the network interface device.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

"In this disclosure, various "modules" operable to perform designated functions are shown in the figures and described in detail. As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC.

What is claimed is:

1. A method, comprising:
providing, by a server system, a service usable to perform a plurality of computing operations for requesting users;
receiving, at the server system from a client device, a request to perform a particular computing operation;
automatically generating, by the server system based on the request and a user associated with the request, a birthright identity for the user and one or more additional identities for the user, wherein the birthright identity is automatically generated based on a name and login identifier (ID) of the user;
assigning, by the server system based on details of the request, the birthright identity and the one or more additional identities to the user, wherein the one or more additional identities are different identity types than the birthright identity assigned to the user;
scoring, by the server system, the birthright identity and the one or more additional identities, wherein the scoring is performed based on accessing a risk score database storing known risk information associated with different identity types, wherein the scoring includes assigning higher scores to the one or more additional identities than a risk score assigned to the birthright identity, and wherein the known risk information indicates whether the birthright identity and the one or more additional identities are currently enabled; and
transmitting, by the server system to the client device, a response to the request, wherein the response is generated based on the scoring.

2. The method of claim 1, wherein the particular computing operation includes one or more of the following: accessing private user data, viewing private user data, processing an electronic communication involving the user associated with the request, responding to a customer service request, and altering program code of the server system.

3. The method of claim 1, wherein the first type of birthright identity includes key materials that the user has access to, and wherein the key materials are usable to access one or more assets, and wherein the different identities assigned to the user are linked within an identity database.

4. The method of claim 1, further comprising:
assigning, by the server system, a risk type to the birthright identity and risk types to the one or more additional identities;
assigning, by the server system, risk types to one or more components included in a plurality of components that perform a series of tasks associated with the particular computing operation; and
assigning, by the server system, a risk type to an asset associated with the particular computing operation.

5. The method of claim 4, further comprising:
altering, by the server system based on the risk types assigned to the identities, risk scores assigned to the birthright identity and the one or more additional identities;
assigning, by the server system based on the risk types assigned to the one or more components, risk scores to the one or more components;
assigning, by the server system based on the risk type assigned to the asset, a risk score to the asset associated with the particular computing operation; and
generating, by the server system based on the risk scores assigned to the one or more components, the risk score assigned to the asset, and the risk scores assigned to the birthright identity and the one or more additional identities, a decision for the request, wherein the transmitting is further performed based on the decision.

6. The method of claim 1, further comprising:
assigning, by the server system, an employee risk type to the user; and
generating, by the server system based on the employee risk type assigned to the user, a new identity that is based on a risk score associated with the employee risk type assigned to the user.

7. The method of claim 1, further comprising:
in response to the request to perform the particular computing operation, performing, by the server system, the particular computing operation via a particular processing flow in which a particular sequence of a plurality of components perform a series of tasks associated with the particular computing operation, wherein the server system includes a plurality of components with corresponding component identifier values; and
generating, by the server system, a particular flow signature value for the particular processing flow, including by generating a flow identifier value for the particular processing flow by combining component identifier values for the particular sequence of components used to perform the series of tasks.

8. The method of claim 7, wherein generating the particular flow signature value for the particular processing flow includes performing a hash operation based on the flow identifier value to generate the particular flow signature value, and wherein the method further comprises:
detecting, by the server system based on a return code associated with the particular flow signature value, an unsuccessful outcome of the particular computing operation; and in response to the detecting, identifying, by the server system, a particular component, of the particular sequence of components, as a point of failure for the particular processing flow.

9. The method of claim 7, further comprising:
determining, by the server system, whether the particular flow signature value matches signatures values included in a list of previously generated signature values corresponding to processing flows that are permissible by the server system, wherein the response is further generated based on determining whether the signature values match.

10. The method of claim 1, further comprising, prior to receiving the request to perform the particular computing operation from the client device:
displaying, by the server system, a user interface to an administrator of the server system, wherein the user interface includes elements selectable by the administrator to specify score thresholds for identity risk scores and risk type risk scores, whether to calculate one or more risk scores, and whether to make a final risk determination for the request.

11. A system, comprising:
at least one processor;
a non-transitory, computer-readable medium having instructions stored thereon that are executable by the at least one processor to cause the system to:
provide a service usable to perform a plurality of computing operations for requesting users;
receive, from a client device, a request to perform a particular computing operation;
automatically generate, based on the request and a user associated with the request, a birthright identity for the user, wherein the birthright identity is automatically generated based on a name and login identifier (ID) of the user;
determine, by accessing a database storing identities, one or more additional identities of the user, wherein the one or more additional identities are different identity types than the birthright identity assigned to the user;
score the birthright identity and the one or more additional identities, wherein the scoring is performed based on accessing a risk score database storing risk scores for different identity types and risk information for the different identity types, wherein a risk score accessed for the one or more additional identities indicates a greater amount of risk than a risk score accessed for the birthright identity, and wherein the risk information indicates whether the birthright identity and the one or more additional identities are currently enabled; and
transmit, to the client device, a response to the request, wherein the response is generated based on the scoring.

12. The system of claim 11, wherein the of birthright identity includes token materials to which the user has access, and wherein the token materials are usable to access one or more assets.

13. The system of claim 11, wherein the instructions are further executable to cause the system to:
assign a risk type to the birthright identity and risk types to the one or more additional identities;
assign risk types to one or more components included in a plurality of components that perform a series of tasks associated with the particular computing operation; and
assign a risk type to an asset associated with the particular computing operation.

14. The system of claim 13, wherein the scoring further includes:
inputting the risk types assigned to the birthright identity, the risk types assigned to the one or more additional identities, the risk types assigned to the one or more components, and the risk types assigned to the asset, into a machine learning model;
wherein the response generated based on the scoring is further generated based on output of the machine learning model.

15. The system of claim 13, wherein the instructions are further executable to cause the system to:
alter, based on the risk types assigned to the identities, risk scores previously assigned to the birthright identity and the one or more additional identities;
assign, based on the risk types assigned to the one or more components, risk scores to the one or more components;
assign, based on the risk type assigned to the asset, a risk score to the asset associated with the particular computing operation; and
generate, based on the risk scores assigned to the one or more components, the risk score assigned to the asset, and the risk scores assigned to the birthright identity and the one or more additional identities, a decision for the request, wherein the transmitting is further performed based on the decision.

16. A non-transitory computer-readable medium having instructions stored thereon that are executable by a server system to perform operations comprising:
providing a service usable to perform a plurality of computing operations for requesting users;
receiving, from a client device, a request to perform a particular computing operation;
automatically generating, based on the request and a user associated with the request, a birthright identity for the user, wherein the birthright identity is automatically generated based on a name and a login identifier (ID) of the user;
assigning, based on details of the request, a plurality of identities and the birthright identity to the user associated with the request, wherein the birthright identity and the plurality of identities are different identity types;
scoring the birthright identity and respective identities in the plurality of identities, wherein the scoring is performed based on accessing a risk score database storing predetermined risk scores associated with different identity types and risk information for the different identity types, wherein a risk score accessed for the plurality of identities indicates a greater amount of risk than a risk score accessed for the birthright identity, and wherein the risk information indicates whether the birthright identity and the plurality of identities are currently enabled; and
transmitting, to the client device, a response to the request, wherein the response is generated based on the scoring.

17. The non-transitory computer-readable medium of claim 16, wherein a first type of identity of the plurality of identities assigned to the user is the birthright identity.

18. The non-transitory computer-readable medium of claim 17, wherein the operations further comprise:
assigning risk types to the plurality of identities;
assigning risk types to one or more components included in a plurality of components that perform a series of tasks associated with the particular computing operation;

assigning a risk type to an asset associated with the particular computing operation; and generating, based on the risk types assigned to the one or more components, the risk type assigned to the asset, and the risk types assigned to the plurality of identities, a decision for the request, wherein the transmitting is further performed based on the decision.

19. The non-transitory computer-readable medium of claim 16, wherein the operations further comprise:

in response to the request to perform the particular computing operation, performing the particular computing operation via a particular processing flow in which a particular sequence of a plurality of components perform a series of tasks associated with the particular computing operation, wherein the server system includes a plurality of components with corresponding component identifier values; and generating a particular flow signature value for the particular processing flow, including by generating a flow identifier value for the particular processing flow by combining component identifier values for the particular sequence of components used to perform the series of tasks.

20. The non-transitory computer-readable medium of claim 19, wherein the operations further comprise:

determining, by the server system whether the particular flow signature value matches signatures values included in a list of previously generated signature values corresponding to processing flows that are permissible by the server system; and altering, by the server system based on determining that the flow signature values do not match, an overall risk score associated with the request.

* * * * *

UNITED STATES PATENT AND TRADEMARK OFFICE
CERTIFICATE OF CORRECTION

| | | |
|---|---|---|
| PATENT NO. | : 12,088,619 B2 | Page 1 of 1 |
| APPLICATION NO. | : 18/059792 | |
| DATED | : September 10, 2024 | |
| INVENTOR(S) | : Jonathan Steele Barth | |

It is certified that error appears in the above-identified patent and that said Letters Patent is hereby corrected as shown below:

In the Claims

In Column 38 (Claim 3), Lines 4-5, please delete "wherein the first type of birthright" and insert -- wherein the birthright --.

In Column 39 (Claim 12), Line 55, please delete "wherein the of birthright" and insert -- wherein the birthright --.

Signed and Sealed this
Eighth Day of October, 2024

Katherine Kelly Vidal
*Director of the United States Patent and Trademark Office*